United States Patent
Sanders et al.

(10) Patent No.: US 11,681,285 B2
(45) Date of Patent: Jun. 20, 2023

(54) DETERMINING DRIVE SYSTEM ANOMALIES BASED ON POWER AND/OR CURRENT CHANGES IN AN IRRIGATION SYSTEM

(71) Applicant: Heartland Ag Tech, Inc., Hancock, WI (US)

(72) Inventors: Russell Sanders, Minnetonka, MN (US); Jeremie Pavelski, Wisconsin Rapids, WI (US)

(73) Assignee: HEARTLAND AG TECH, INC., Hancock, WI (US)

( * ) Notice: Subject to any disclaimer, the term of this patent is extended or adjusted under 35 U.S.C. 154(b) by 0 days.

(21) Appl. No.: 17/568,191

(22) Filed: Jan. 4, 2022

(65) Prior Publication Data
US 2022/0214682 A1 Jul. 7, 2022

Related U.S. Application Data

(60) Provisional application No. 63/133,542, filed on Jan. 4, 2021.

(51) Int. Cl.
G05B 23/02 (2006.01)

(52) U.S. Cl.
CPC ............... *G05B 23/0283* (2013.01)

(58) Field of Classification Search
CPC .......................... G05B 23/0283; A01G 25/092
See application file for complete search history.

(56) References Cited

U.S. PATENT DOCUMENTS

| | | | | |
|---|---|---|---|---|
| 4,176,395 A | * | 11/1979 | Evelyn-Veere | G05D 22/02 |
| | | | | 239/69 |
| 9,874,489 B1 | * | 1/2018 | Jerphagnon | G01M 3/04 |
| 10,384,557 B2 | | 8/2019 | Abts et al. | |
| 2014/0110498 A1 | | 4/2014 | Nelson et al. | |
| 2017/0349060 A1 | | 12/2017 | Abts et al. | |
| 2018/0348714 A1 | * | 12/2018 | Larue | G05B 13/041 |

(Continued)

FOREIGN PATENT DOCUMENTS

| | | | |
|---|---|---|---|
| CN | 111239481 A | * | 6/2020 |
| WO | 2019216975 A1 | | 11/2019 |

(Continued)

OTHER PUBLICATIONS

International Search Report and Written Opinion issued by the European Patent Office in connection with International Application No. PCT/US2022/011114, dated Apr. 11, 2022.

*Primary Examiner* — Stephanie E Bloss
(74) *Attorney, Agent, or Firm* — Carter, DeLuca & Farrell LLP

(57) ABSTRACT

A predictive maintenance system for an irrigation system includes one or more sensors configured to generate a signal indicative of abnormal operation within the irrigation system, the sensors electrically coupled to a drive system, a processor, and a memory. The memory includes instructions stored thereon, which when executed by the processor cause the predictive maintenance system to receive the generated signal, determine abnormal operation of the drive system based on the generated signal, and predict, by a machine learning model, a maintenance requirement of the drive system based on the determined abnormal operation.

20 Claims, 23 Drawing Sheets

(56) References Cited

U.S. PATENT DOCUMENTS

| | | | |
|---|---|---|---|
| 2019/0259108 A1* | 8/2019 | Bongartz | A01G 31/042 |
| 2020/0023395 A1 | 1/2020 | Tangen et al. | |
| 2020/0184153 A1* | 6/2020 | Bongartz | A01G 9/249 |
| 2020/0305366 A1* | 10/2020 | Burkey | A01G 25/16 |
| 2020/0331016 A1 | 10/2020 | Akin et al. | |
| 2020/0383283 A1* | 12/2020 | Thatcher | G05B 19/042 |
| 2021/0169025 A1* | 6/2021 | Burgard | A01G 25/167 |
| 2022/0030783 A1 | 2/2022 | Moeller | |
| 2022/0030784 A1* | 2/2022 | Charling | A01G 25/092 |

FOREIGN PATENT DOCUMENTS

| | | | | |
|---|---|---|---|---|
| WO | WO-2019158754 A9 * | 12/2019 | | G01R 23/16 |
| WO | WO-2020247904 A1 * | 12/2020 | | A01G 25/092 |
| WO | WO-2021050341 A1 * | 3/2021 | | A01G 25/092 |

* cited by examiner

Meter Data

[ Browse... | No file selected ]

Base Station Data

[ Browse... | No file selected ]

Pivot
⊙ H62
Location
○ inner  ⊙ middle  ○ end
Last Number Observations
○ Last_10  ⊙ Last_100  ○ Last_1000  ○ Last_10000

[Get ML Results]

[⭳ Download Results]

FIG. 15

Meter Data

| Browse... | No file selected |

Base Station Data

| Browse... | No file selected |

Pivot

○ H62

○ TBD

FIG. 21

Meter Data

| Browse... | 1x_H-62_Reverse_Normal-2020-04-04 |

////////// Upload Complete //////////

Base Station Data

| Browse... | 20200413_PivotStateHistsory_BaseStati |

////20200413_PivotStateHistory_BaseStation3.csv////

Pivot

⦿ H62

○ TBD

FIG. 22

DETERMINING DRIVE SYSTEM ANOMALIES BASED ON POWER AND/OR CURRENT CHANGES IN AN IRRIGATION SYSTEM

CROSS-REFERENCE TO RELATED APPLICATIONS

The present application claims the benefit of U.S. Provisional Patent Application No. 63/133,542, filed on Jan. 4, 2021, the entire contents of which are hereby incorporated herein by reference.

TECHNICAL FIELD

This disclosure relates to irrigation systems and, more particularly, to structures and methods for effectuating predictive maintenance of irrigation systems.

BACKGROUND

Irrigation systems such as pivots, lateral move systems, drip irrigation systems, etc. breakdown on average three times per year out of 40 uses. These breakdowns occur during critical growing steps and in many cases in the middle of the field.

SUMMARY

To limit delays, increased costs and other problems associated with irrigation system breakdown, this disclosure details a solution including digital observation of the irrigation system during normal operation and set parameters that indicate abnormal operation. To observe these operational anomalies, sensors may be added to the irrigation system to provide data for algorithms to process. These algorithms may be logic or analytics based. Existing operational data from off the shelf may be used in some cases. In aspects, other data sources may be external to the system such as National Oceanic and Atmospheric Administration (NOAA) weather, topographical maps, soil moisture, etc., or combinations thereof.

According to one aspect, a predictive maintenance system for an irrigation system (e.g., a farming, mining, etc., irrigation system) includes a drive system. The predictive maintenance system includes at least one sensor configured to generate a signal indicative of abnormal operation within the irrigation system, the sensor electrically coupled to the drive system, a processor, and a memory. The memory includes instructions stored thereon, which when executed by the processor cause the predictive maintenance system to receive the generated signal, determine abnormal operation of the drive system based on the generated signal, and predict, by a machine learning model, a maintenance requirement of the drive system based on the determined abnormal operation.

In an aspect of the present disclosure, the instructions, when executed by the processor, may further cause the predictive maintenance system to display on a display the predicted maintenance requirement of the drive system.

In another aspect of the present disclosure, the sensor may be configured to measure an amount of a reactive power, a real power, an apparent power, and/or a current within the irrigation system.

In yet another aspect of the present disclosure, the signal indicative of abnormal operation may include an indication of movement and/or positioning of the drive system over a period of time.

In a further aspect of the present disclosure, the signal indicative of abnormal operation may be based on the reactive power, the real power, the apparent power, and/or the current being above or below a predetermined threshold.

In yet a further aspect of the present disclosure, the sensor may include a current sensor, a power sensor, a voltage sensor, or combinations thereof.

In an aspect of the present disclosure, the instructions, when executed by the processor, may further cause the predictive maintenance system to transmit an indication of the predicted maintenance requirement, to a user device for display and display, on a display of the user device, the indication of the predicted maintenance requirement.

In another aspect of the present disclosure, the machine learning model may be based on a deep learning network, a classical machine learning model, or combinations thereof.

In yet another aspect of the present disclosure, the instructions, when executed by the processor, may further cause the predictive maintenance system to receive data from at least one of a weather station, a field soil moisture sensor, a terrain and soil map, a temperature sensor, or National Oceanic and Atmospheric Administration weather.

In a further aspect of the present disclosure, the prediction may be based on comparing a power and/or a duty cycle sensed by the sensor to an expected power and/or duty cycle.

According to another aspect, a computer-implemented method for predictive maintenance for an irrigation system is presented. The computer-implemented method includes: receiving a signal, sensed by a sensor coupled to a drive system of the irrigation system, the signal indicative of a condition of abnormal operation of the drive system, the irrigation system configured to irrigate a farming area; determining abnormal operation of the drive system; and predicting, by a machine learning model, a maintenance requirement of the drive system based on the determined abnormal operation.

In yet a further aspect of the present disclosure, the method may further include displaying on a display the predicted maintenance requirement of the drive system.

In an aspect of the present disclosure, the sensor may be configured to measure an amount of a reactive power, a real power, an apparent power, and/or a current within the irrigation system.

In another aspect of the present disclosure, the signal indicating a condition of abnormal operation may include an indication of movement and/or positioning of the drive system over a period of time.

In yet another aspect of the present disclosure, the signal indicating a condition of abnormal operation may be based on an end gun turn frequency being above or below a predetermined threshold.

In a further aspect of the present disclosure, the sensor may include a current sensor, a power sensor, a voltage sensor, or combinations thereof.

In another aspect of the present disclosure, the method may further include transmitting an indication of the predicted maintenance requirement, to a user device for display and displaying, on a display of the user device, the indication of the predicted maintenance requirement.

In yet a further aspect of the present disclosure, the machine learning model may be based on a deep learning network, a classical machine learning model, or combinations thereof.

In an aspect of the present disclosure, the prediction may be based on comparing a power sensed by the sensor to an expected power based on at least one of a soil moisture directly measured, a soil moisture inferred from weather data from the field and/or regional weather stations, a topographical map, a soil map, a motor RPM, a gearbox ratio, a tower weight, a span weight, an operating condition of the drive system, or combinations thereof.

According to another aspect, a non-transitory computer-readable medium stores instructions that, when executed by a processor, cause the processor to perform a method for predictive maintenance for an irrigation system is presented. The method includes: receiving a signal, sensed by a sensor coupled to a drive system of the irrigation system, the signal indicative of a condition of abnormal operation of the drive system, the irrigation system configured to irrigate a farming area; determining abnormal operation of the drive system; predicting, by a machine learning model, a maintenance requirement of the drive system based on the determined abnormal operation; and displaying on a display the predicted maintenance requirement of the drive system.

Other aspects, features, and advantages will be apparent from the description, the drawings, and the claims that follow.

BRIEF DESCRIPTION OF DRAWINGS

The accompanying drawings, which are incorporated in and constitute a part of this specification, illustrate aspects of the disclosure and, together with a general description of the disclosure given above and the detailed description given below, serve to explain the principles of this disclosure, wherein:

FIGS. 15-22 are screen shots of example user interface screens of the predictive maintenance system.

DETAILED DESCRIPTION

Figure 1:
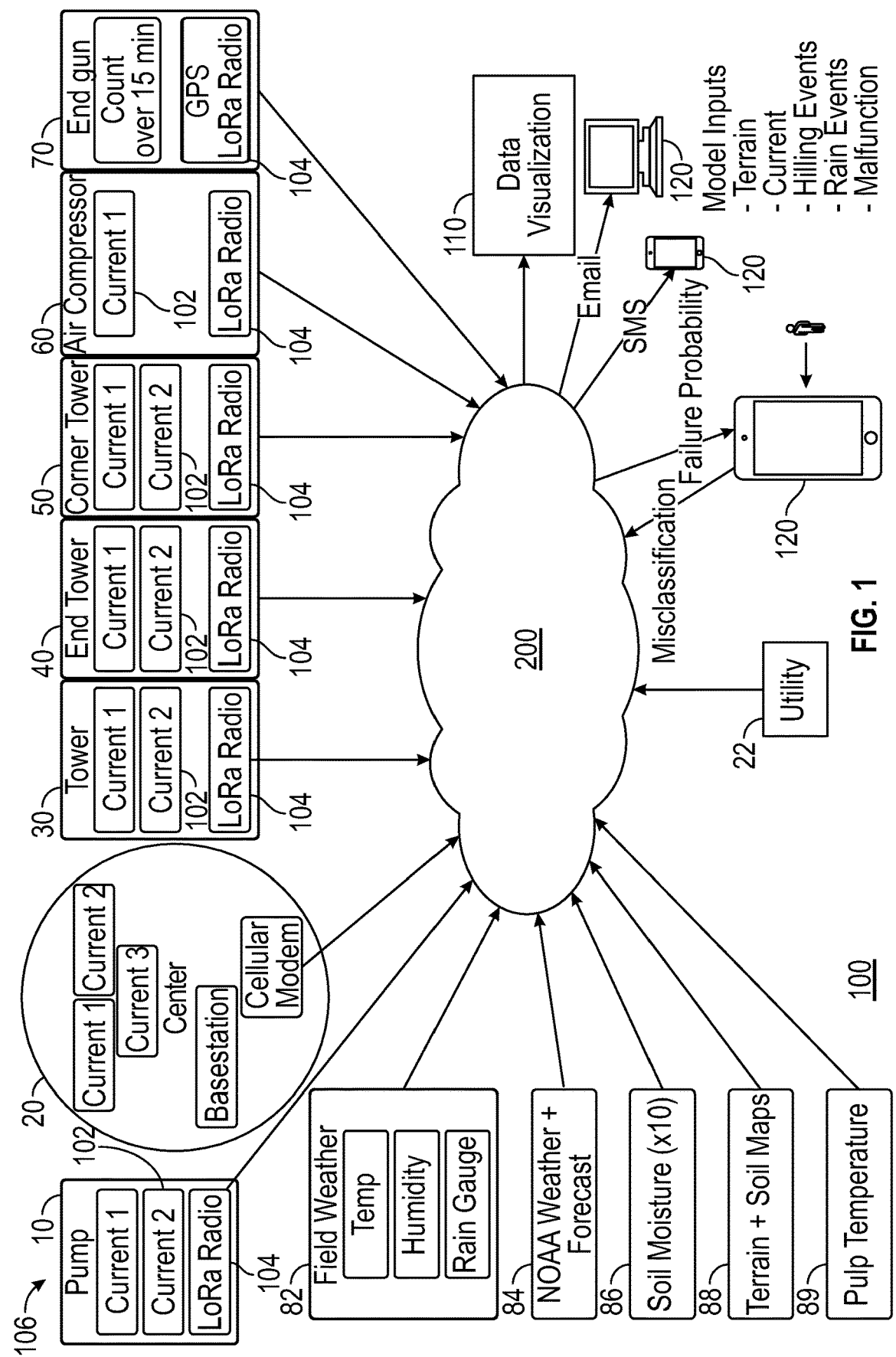
FIG. 1 is a diagram illustrating a predictive maintenance system.

Aspects of the disclosed predictive maintenance systems are described in detail with reference to the drawings, in which like reference numerals designate identical or corresponding elements in each of the several views. Directional terms such as top, bottom, and the like are used simply for convenience of description and are not intended to limit the disclosure attached hereto.

In the following description, well-known functions or constructions are not described in detail to avoid obscuring the present disclosure in unnecessary detail.

Advantageously, the disclosed system predicts common unexpected downtime versus notification that it occurred after the fact. The disclosed system provides better insight than a team driving around to observe operation (which can be subjective). Technology today only notifies of failure after the failure has occurred, whereas the disclosed system predicts a maintenance requirement before the failure occurs.

Other diagnostic health measurements are after-the-fact, logic based, and do not attempt to assign a system health. This system predicts failure before the failure occurs, like a check engine light for a car, or a digital twin for connected equipment. Further, while the disclosed system is described herein in connection with irrigation for a potato or vegetable farm, this system can be modified for any suitable farming operation requiring irrigation and can include drip irrigation systems, linear pivot systems, and/or center pivot systems.

With reference to FIGS. 1 and 7-9, an end gun predictive maintenance system 100 is provided. Generally, the end gun predictive maintenance system 100 includes an irrigation system 106 and a controller 200 configured to execute instructions controlling the operation of the end gun predictive maintenance system 100. The irrigation system 106 may include a pump 10 (e.g., a compressor, see FIG. 11), a pivot 20, one or more towers 30, an end tower 40, a corner tower 50, an air compressor 60, and an end gun 70 (e.g., a movable nozzle, big gun, or movable gun which may be mounted on a pivot and/or an operably associated movable cart). The pump 10 may include one or more current sensors and a wireless communication device 104 configured to transmit data wirelessly to the controller 200 (e.g., sensed current data). The pivot 20 may include one or more sensors 102 and a wireless communication device 104 configured to transmit data wirelessly to the controller 200. Each tower 30, corner tower 50, and end tower 40 may include one or more sensors 102 and a wireless communication device 104 configured to transmit data wirelessly to the controller 200. The wireless communication device may include, for example, 3G, LTE, 4G, 5G, Bluetooth, and/or Wi-Fi, etc. The sensors 102 may include at least one of a current sensor, a voltage sensor, and/or a power sensor configured to sense, for example, current, voltage, and/or power, respectively.

In aspects, the one or more sensors 102 can include any suitable sensors such as, for example, an encoder (e.g., an angular encoder), pressure sensor, flow meter, etc., or combinations thereof. An angular encoder is a form of position sensor that measures the angular position of a rotating shaft.

In aspects, the one or more sensors may be connected (e.g., directly) and/or may be standalone components that may be connected via wide area network (WAN). In aspects, the one or more sensors may be aggregated in the cloud based on provisioning settings. In aspects, the one or more sensors may include, for example, low-power wide area network technology (LPWAN) which may be long-range (LoRa).

In aspects, the controller 200 may determine changes in the condition of the at least one component based on comparing the generated signal to predetermined data.

The controller 200 is configured to receive data from the sensors 102 as well as from external data sources such as weather stations 82, field soil moisture sensors 86, terrain and soil maps 88, temperature sensors 89, and/or National Oceanic and Atmospheric Administration (NOAA) weather 84 to make and/or refine predictions indicative of a condition of at least one component (e.g., a pivot 20, an end gun 70, a tower 30, etc.) of the plurality of components of the irrigation system 106. This prediction enables the controller 200 to determine changes in the condition of the at least one component and predict maintenance requirements of the at least one component based on predetermined data (e.g., historical data). For example, the prediction may be based on comparing the determined changes in the condition of at least one component of the irrigation system 106 to predetermined data. For example, the sensor 102 of a tower 30 may sense the typical current draw of that tower 30. The sensed current draw may then be compared by the controller 200 to historical and/or typical tower current draw. The controller may determine that the sensed current draw of this tower 30 is considerably higher than the historical current draw by a predetermined number (e.g., about 30%) for a particular set of conditions (sunny day, dry soil, etc.). Based on this determination, the controller 200 may predict that this tower 30 needs maintenance. Additionally, the specific type of maintenance may be able to be predicted. For example, if the motor current of a tower 30 is high, it may indicate a flat tire. The system 100 may additionally predict the number of hours typically taken to repair such an occurrence. In another example, the system may sense, by the sensor 102 that the current on a pump 10 is low, and accordingly, predict that there is a pump 10 failure.

Data from the external data sources may be used to improve model predictions. For example, by processing data such as higher power use to motors of the towers 30 because the field is muddy due to recent rain, such processed data can be used to improve model predictions. The pivot end gun predictive maintenance system 100 may display field maps for terrain, soil types, etc. that help the model explain variation in power use. The predictions may be transmitted to a user device 120, by the controller 200, for display and/or further analysis.

In aspects, the data and/or predictions may be processed by a data visualization system 110. Data visualization is the graphical representation of information and data. By using visual elements like charts, graphs, and maps, data visualization tools provide an accessible way to see and understand trends, outliers, and patterns in data.

In aspects, the pivot end gun predictive maintenance system 100 may be implemented in the cloud. For instance, Linux, which may run a Python script, for example, can be utilized to effectuate prediction.

Figure 2:
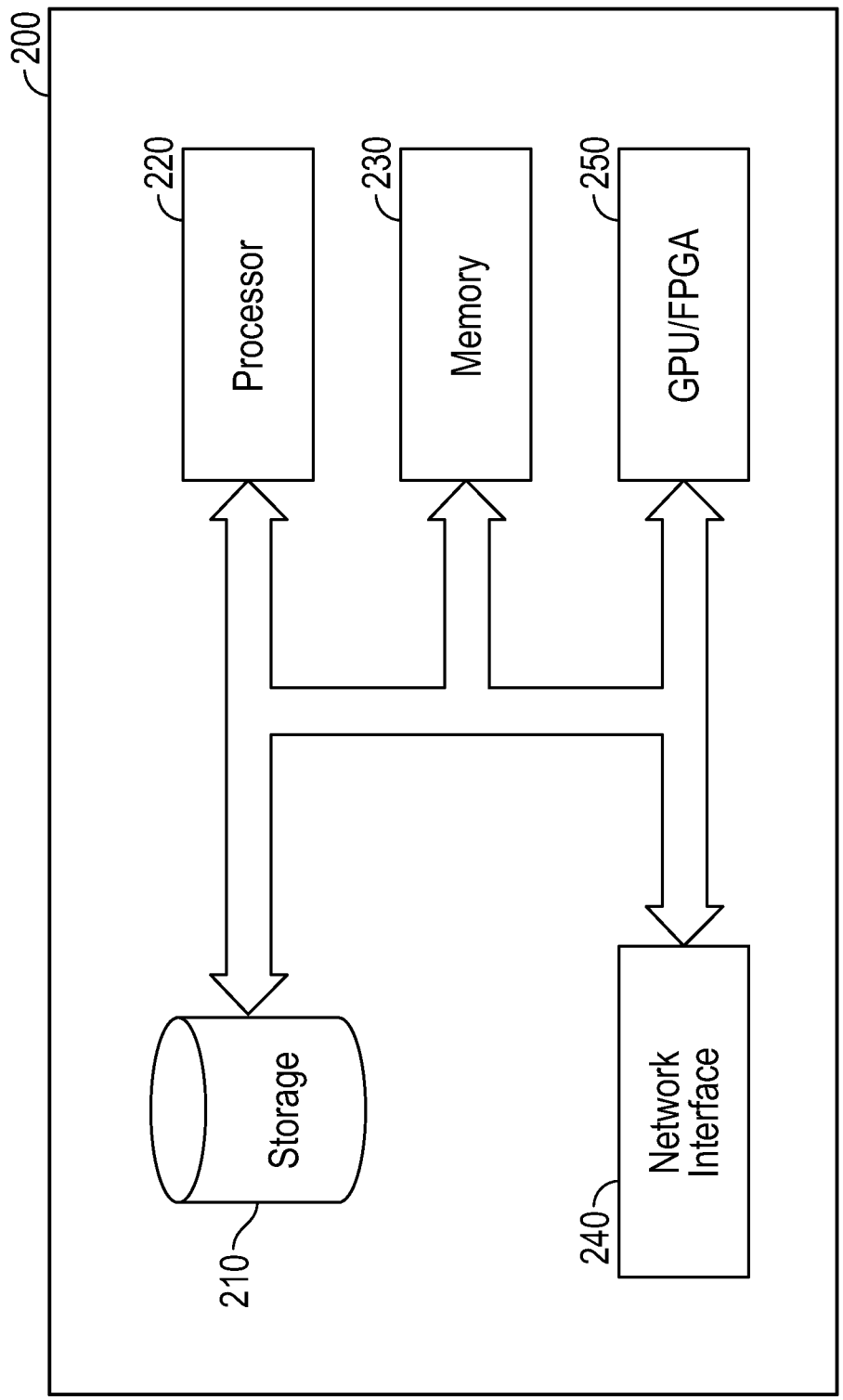
FIG. 2 is a block diagram of a controller configured for use with the predictive maintenance system of FIG. 1.

FIG. 2 illustrates that controller 200 includes a processor 220 connected to a computer-readable storage medium or a memory 230. The computer-readable storage medium or memory 230 may be a volatile type of memory, e.g., RAM, or a non-volatile type of memory, e.g., flash media, disk media, etc. In various aspects of the disclosure, the processor 220 may be another type of processor such as a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data.

The disclosed method may run on the controller 200 or on a user device, including, for example, on a mobile device, an IoT device, or a server system.

Figure 3:
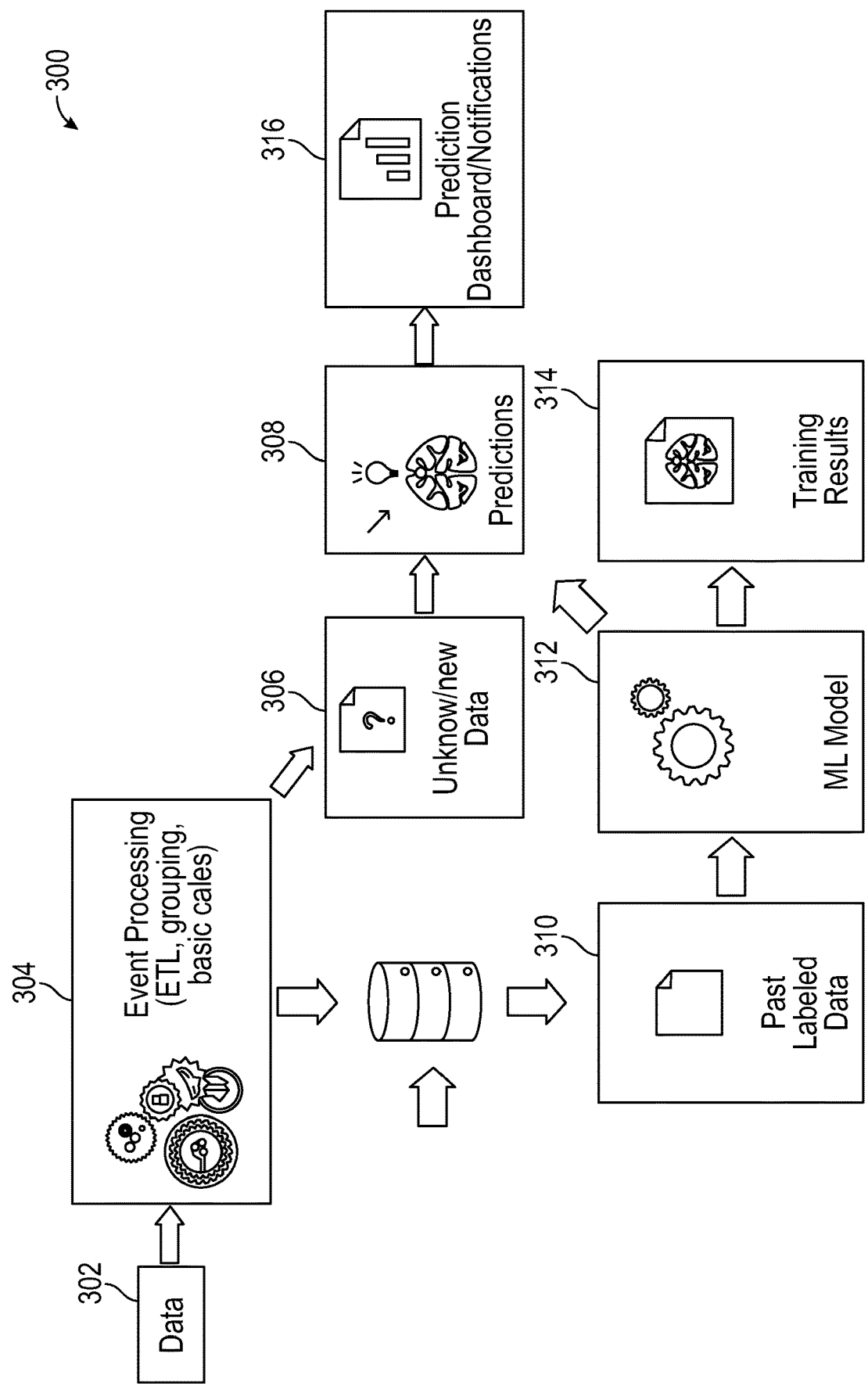
FIG. 3 is a diagram illustrating a machine learning model configured for use with the predictive maintenance system of FIG. 1.

FIG. 3 illustrates a machine learning model 300 and dataflow\storage\feedback of the pivot predictive maintenance system. The machine learning model 300 can be hosted at the pivot 20 or in the cloud (e.g., a remote server). The machine learning model 300 may include one or more convolutional neural networks (CNN).

In machine learning, a convolutional neural network (CNN) is a class of artificial neural network (ANN), most commonly applied to analyzing visual imagery. The convolutional aspect of a CNN relates to applying matrix processing operations to localized portions of an image, and the results of those operations (which can involve dozens of different parallel and serial calculations) are sets of many features that are used to train neural networks. A CNN typically includes convolution layers, activation function layers, and pooling (typically max pooling) layers to reduce dimensionality without losing too many features. Additional information may be included in the operations that generate these features. Providing unique information that yields features that give the neural networks information can be used to ultimately provide an aggregate way to differentiate between different data input to the neural networks. In aspects, the machine learning model 300 may include a combination of one or more deep learning networks (e.g., a CNN), and classical machine learning models (e.g., an SVM, a decision tree, etc.). For example, the machine learning model 300 may include two deep learning networks.

In aspects, two labeling methods for the training data may be used, one based on a connection with a computer maintenance system (CMMS) and one based on user input. In aspects, the user can be prompted to label data, or can provide the data manually (e.g., at the "time of service" events).

Figure 4A:
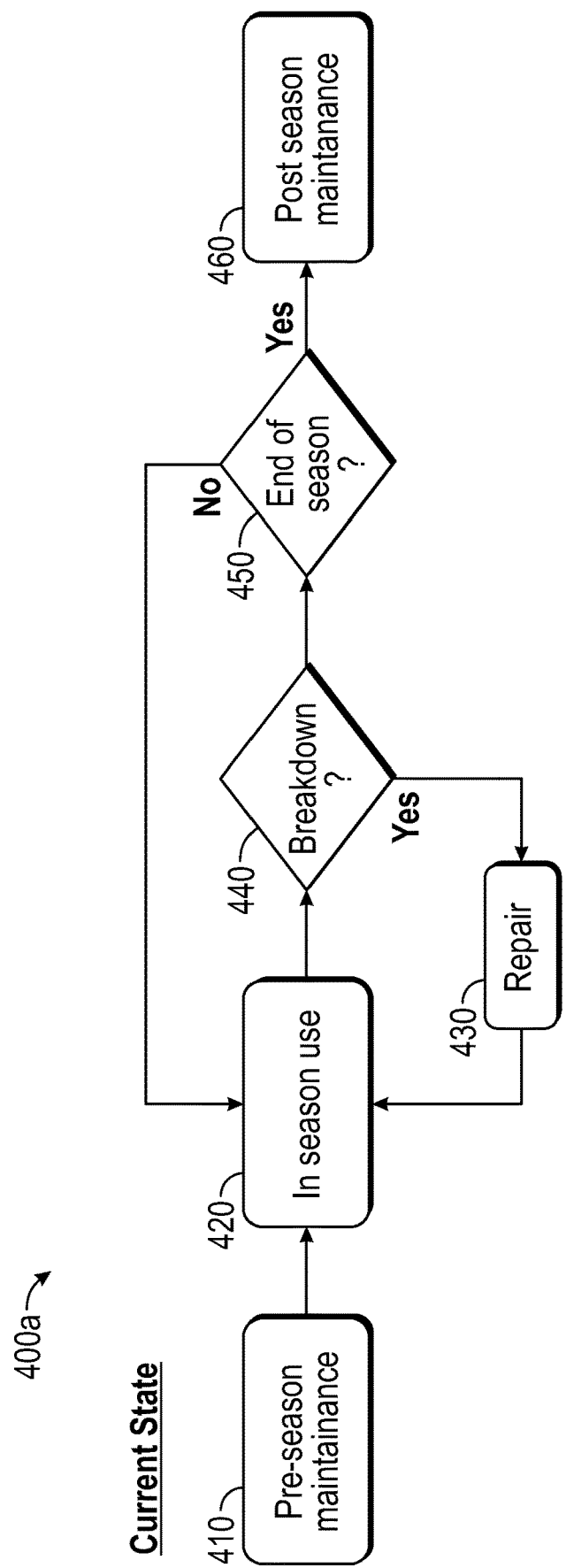
FIG. 4A illustrates an exemplary flow chart of a typical farm operation.

As noted above, FIG. 4A illustrates an exemplary flow chart of a typical farm operation 400a. Generally, at step 410, pre-season maintenance is performed on the irrigation equipment. Next, at step 420, the irrigation equipment is used in season. At step 440, if equipment is determined to have broken down, it is sent in for repair at step 430. At the end of the season (step 450), post-season maintenance is performed (step 460).

Figure 4B:
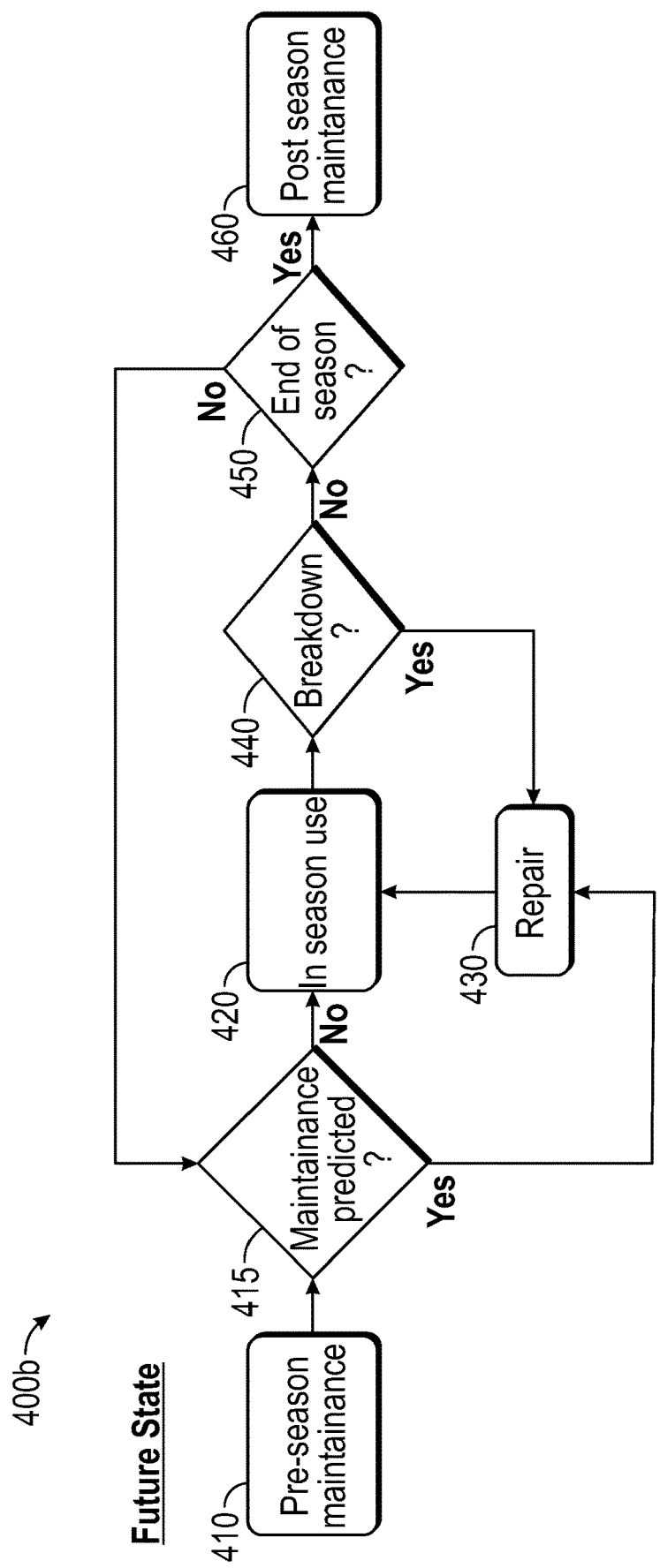
FIG. 4B illustrates an exemplary flow chart of a farm operation including a predictive maintenance system in accordance with the principles of this disclosure.

FIG. 4B illustrates an exemplary flow chart 400b of a farm operation including an end gun predictive maintenance system 100 in accordance with the principles of this disclosure. Generally, at step 410, pre-season maintenance is performed on the irrigation equipment. Next, the end gun predictive maintenance system 100 predicts whether maintenance is needed for a particular piece of the irrigation equipment. If maintenance is predicted at step 415, then at step 430, the equipment is examined and repaired. Next, at step 420, the irrigation equipment is used in season. At step 440, if equipment is determined to have broken down, the equipment is sent in for repair at step 430. At the end of the season (step 450), post-season maintenance is performed (step 460).

Figure 5:
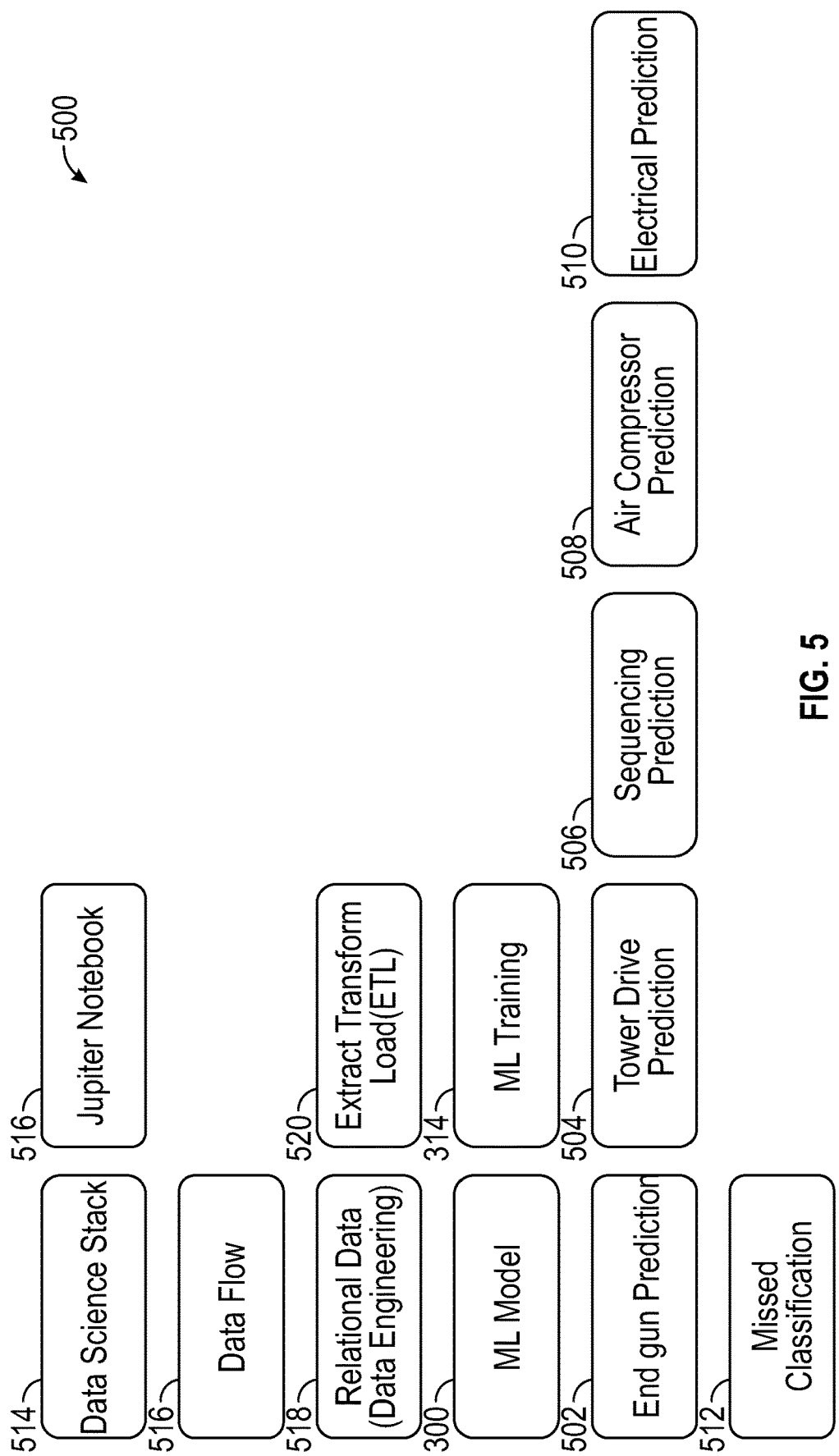
FIG. 5 illustrates a data science work-flow with various models of the predictive maintenance system illustrated in FIG. 1.
Figure 6:
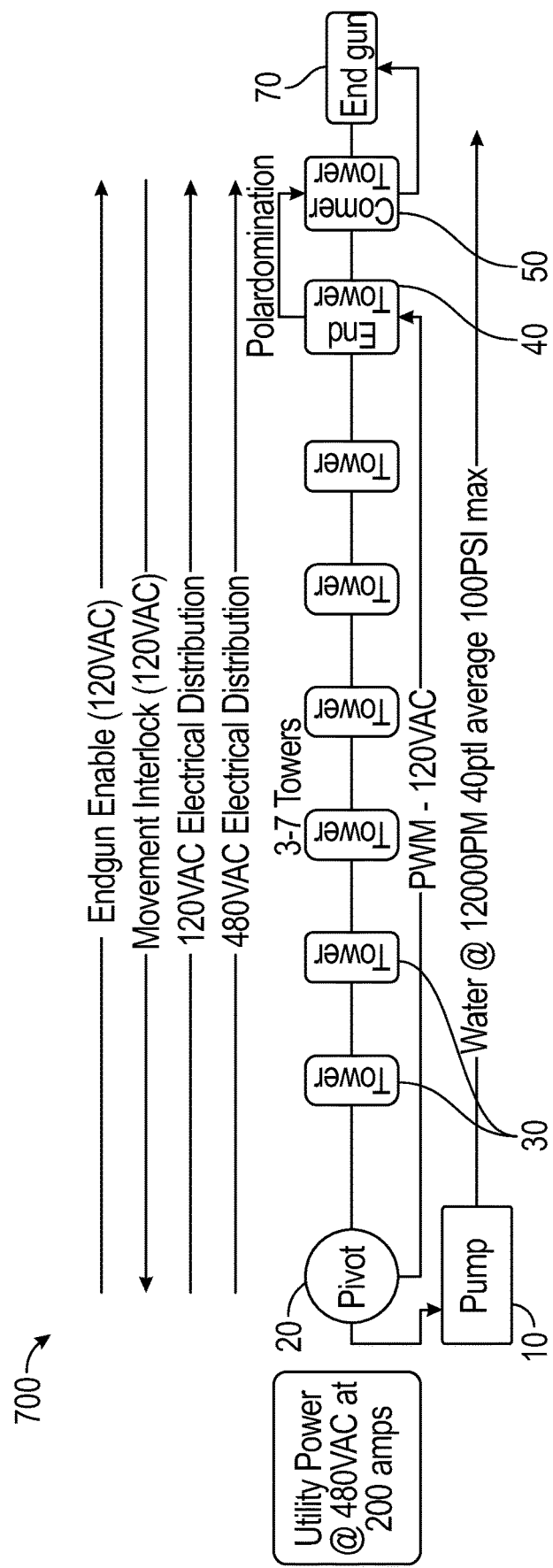
FIGS. 6-8 are diagrams of example hardware interface and instrumentation of the predictive maintenance system of FIG. 1.
Figure 7:
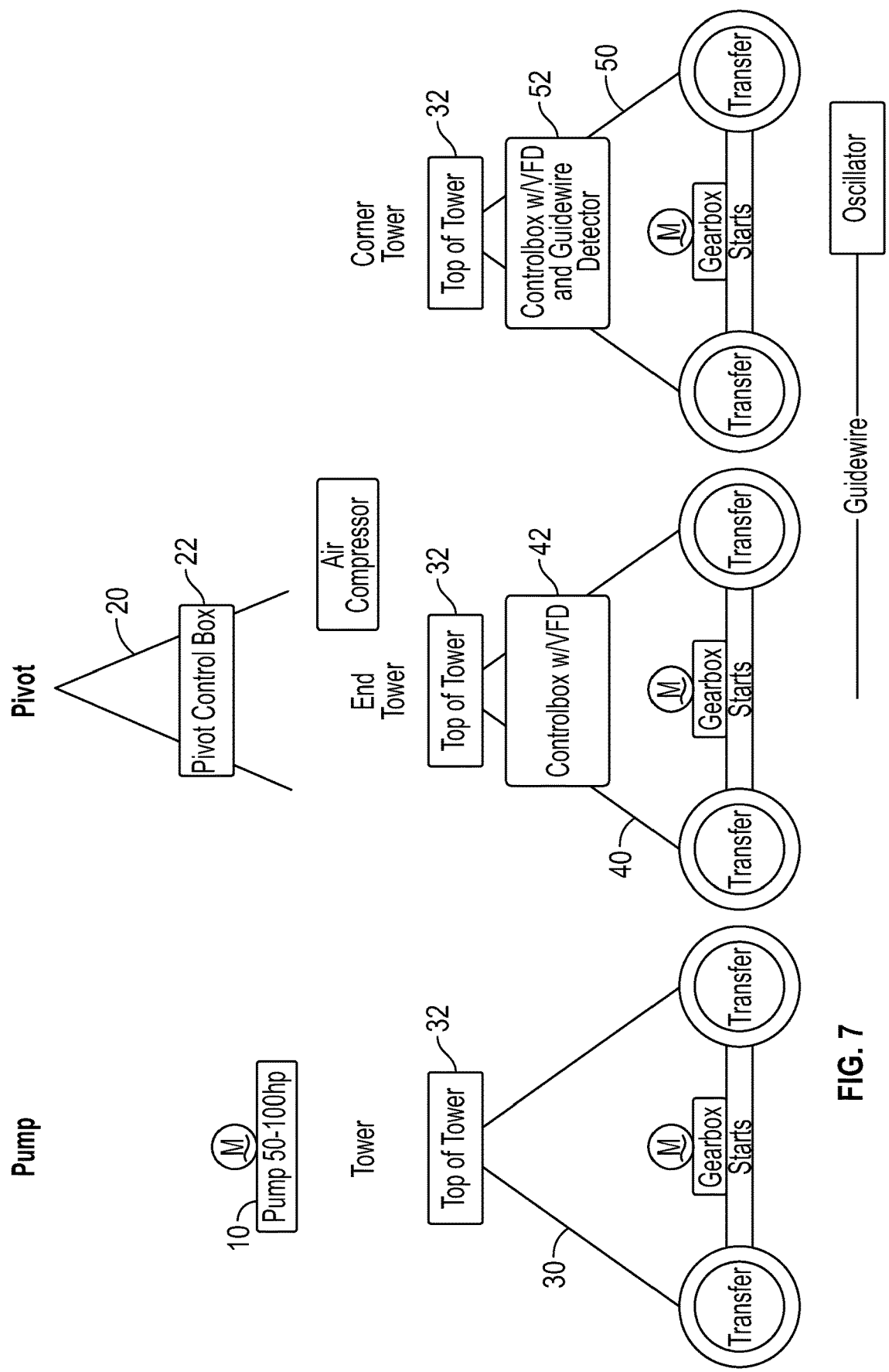
Figure 8:
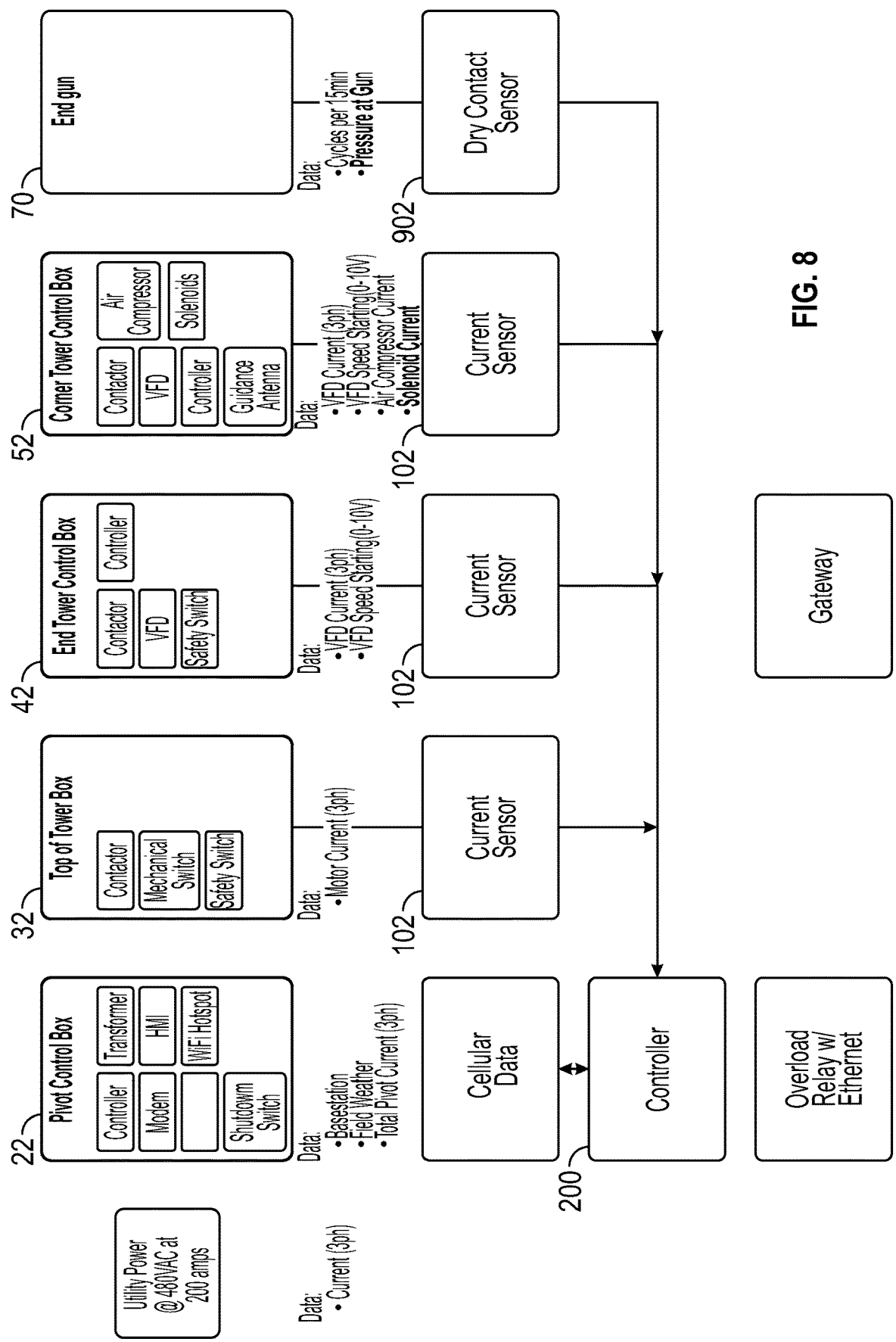
Figure 9:
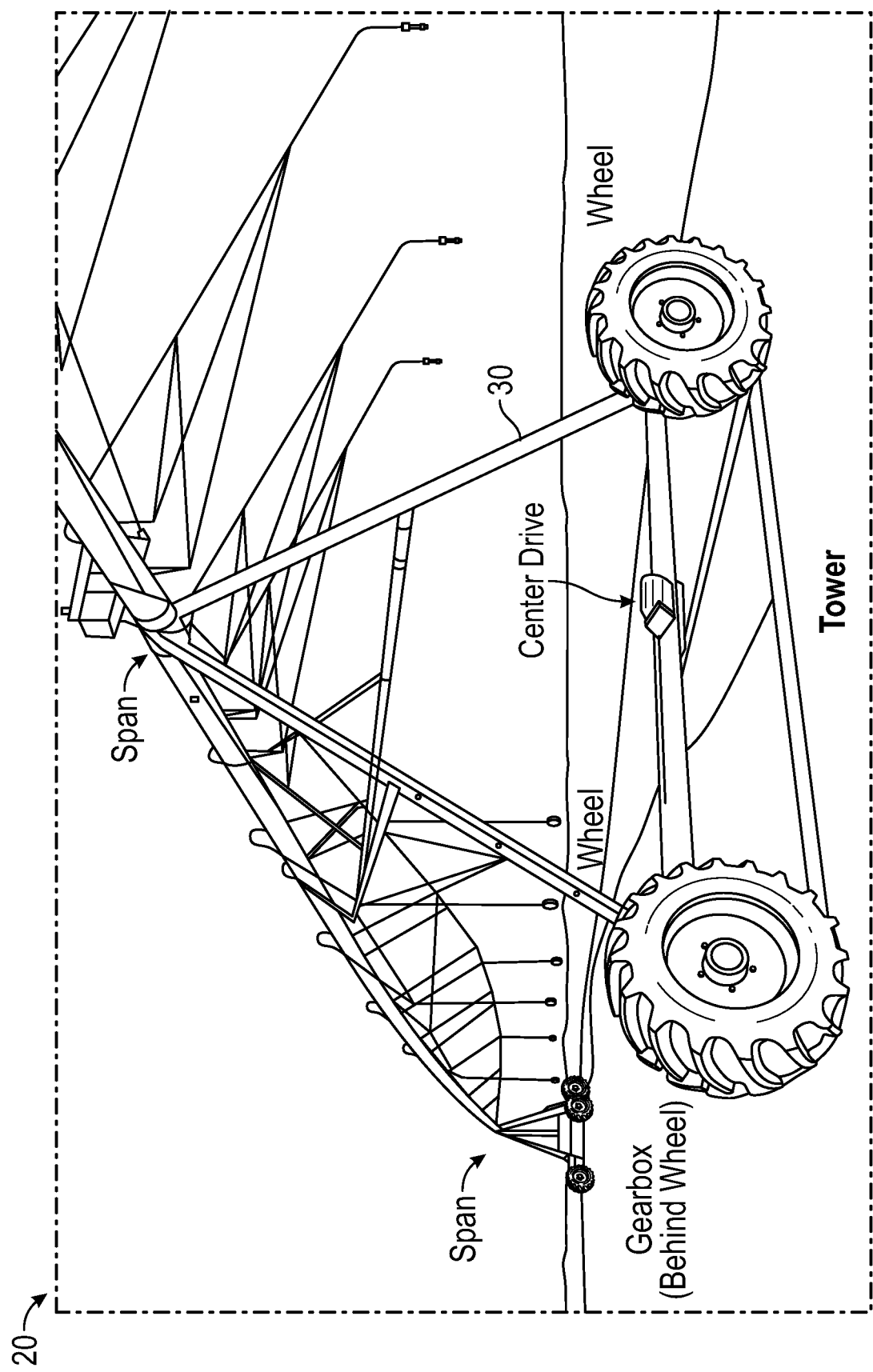
FIG. 9 is perspective view of a portion of an exemplary pivot of the predictive maintenance system of FIG. 1.
Figure 10:
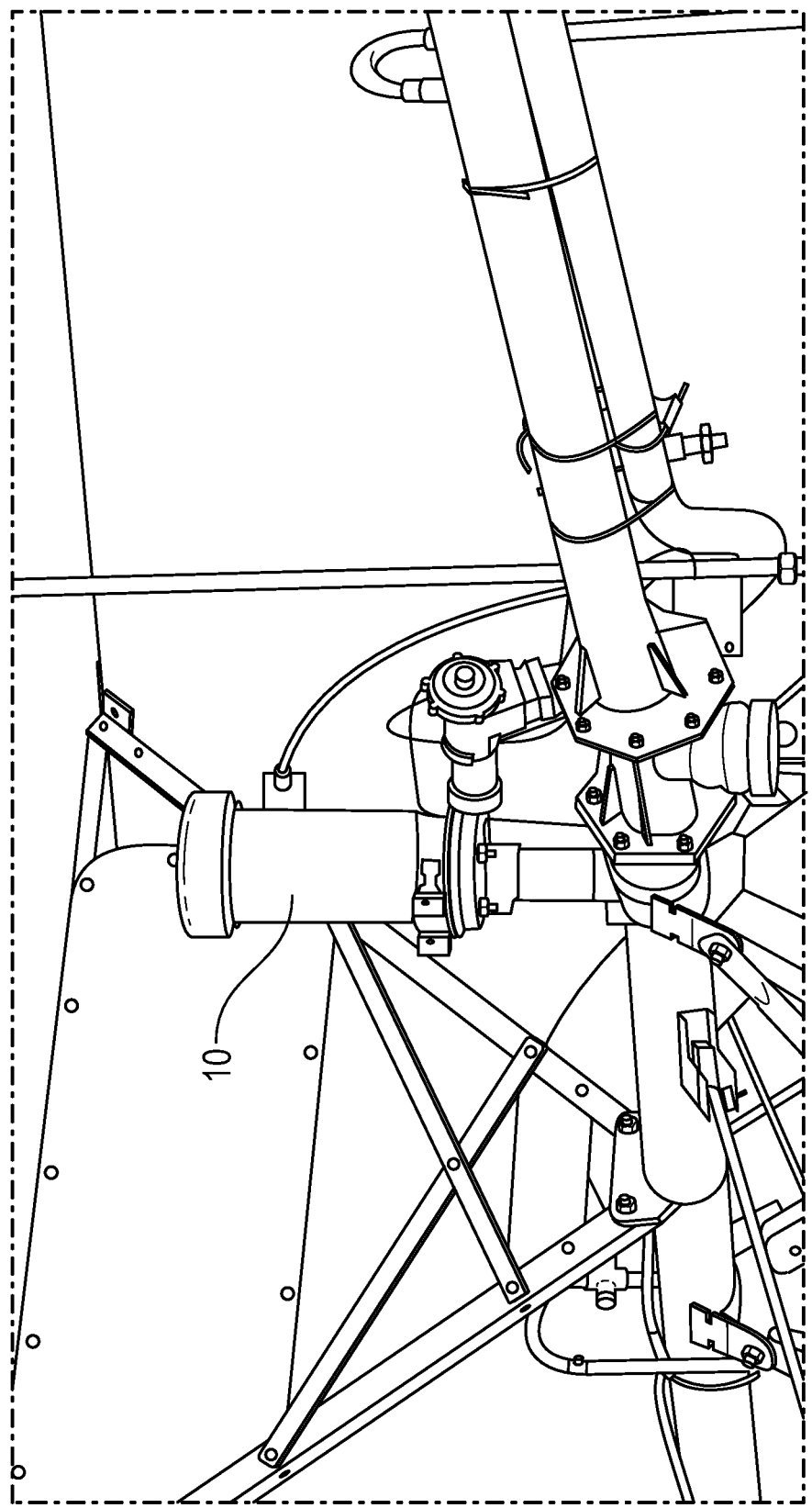
FIG. 10 is a perspective view of a portion of air compressor instrumentation of another exemplary pivot of the predictive maintenance system of FIG. 1.

FIG. 5 illustrates a data science work-flow with various models of the predictive maintenance system illustrated in FIG. 4B.

The five models include an end gun prediction model 502, a tower drive prediction model 504, a sequencing prediction model 506, an air compression prediction model 508, and an electrical prediction model 510. The models may be implemented via logic and/or machine learning.

Figure 18:
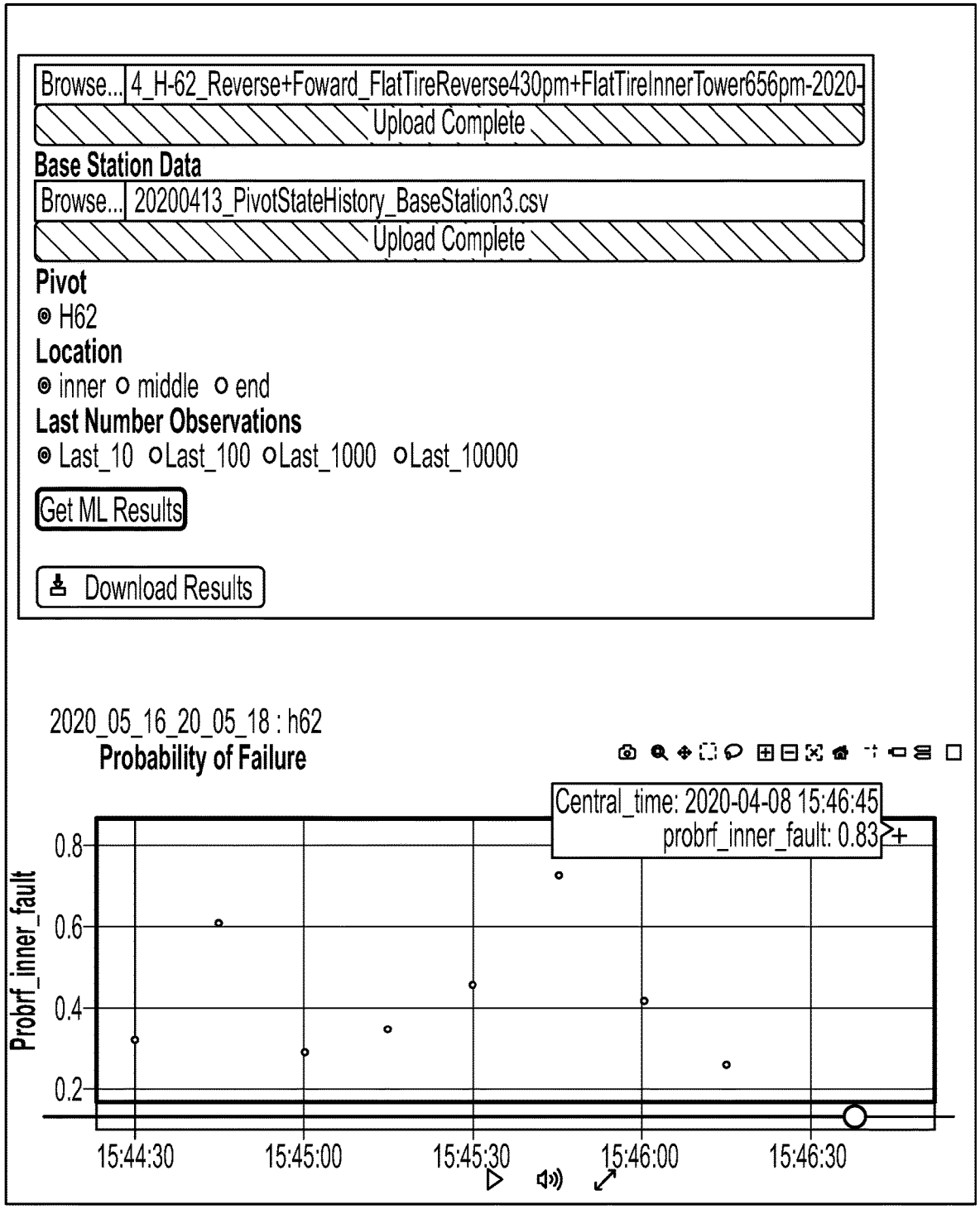

With reference to FIGS. 5 and 18, an end gun prediction model 502 is shown. The end gun prediction model may count the number of times the end gun 70 (FIG. 1) takes to pass from left to right and back. Expected time to pass left and right may be based on pressure, bearing condition, tension, etc., or combinations thereof.

The end gun prediction model 502 can consider expected power based on soil moisture directly measured or inferred from weather data from the field or regional weather stations, topographical maps, soil maps, motor RPM, gearbox ratio, tower weight, span weight, operating condition, etc., or combinations thereof. The end gun 70 includes instrumentation which can measure each cycle using a proximity switch, encoder, capacitance, and/or image system. Aspects of the end gun predictive maintenance system 100 predictive maintenance system 100 can be mounted on or off the irrigation system 106, for example, a moisture sensor that logs when the moisture sensor is splashed remotely by the water being distributed to the field. If an electronic gun is used, energy use and duty cycle can be used. In aspects, the one or more sensors can include any suitable sensors such as, for example an encoder (e.g., angular), pressure sensor, flow meter, magnetometer, gyroscope, accelerometer, camera, gesture sensor, microphone, laser range finder, reed/magnetic/optical switch, etc., or combinations thereof. The end gun prediction model 502 may also include as inputs the pump pressure, the model number of the end gun, the end gun nozzle diameter, the drive arm spring setting, the diffuser type, a flow measurement, a drive arm spring K-factor, a drive arm balance, a drive arm bearing condition, a base bearing condition, a base seal condition, a drive arm alignment, and/or a mounting base rigidity. The nozzle type can be inferred from a measured flow and measured pressure. In aspects, the end gun prediction model 502 may predict a drive arm impact frequency, an acceleration magnitude per drive arm impact, an angular rate forward, an angular rate reverse, a heading change rate forward or reverse, a time per pass, and/or a time to flip a reversing lever. The model outputs can be used to further predict abnormal operation.

Abnormal operation of the end gun may be further based on movement and/or positioning of the movable end gun 70 relative to the pivot 20 over time. For example, the system 100 may monitor the drive arm frequency using an accelerometer and/or gyroscope, and/or the heading change of the end gun 70 may be determined by a magnetometer. The end gun 70 may typically be "on" for about fifteen degrees of rotation from the time it is started to the time it is stopped. The sensor 102 may sense that the end gun 70 was on for about three degrees of rotation and the controller may determine that this was abnormal operation and that the end gun 70 may need maintenance. In aspects, the logic for determining abnormal operation may be based on a sliding window over seconds, minutes, hours, days, and/or years.

Monitoring output parameters such as end gun 70 timing, flow, an/or pressure can also help infer air compressor health.

For example, if a farmer was applying too much pressure to the end gun 70, the water and fertilizer may get thrown over the crop, leading to dry rings. The pressure sensor may sense that the end gun pressure was dropping to about 40 psi from a normal 71 psi. The end gun prediction model 502 may predict that the system is operating abnormally based on the pressure measurement over time. The pressure may have been initially high, and then drop about 10 psi over the next hour. The farmer may have been operating at too high of a pressure because the booster pump was dropping out and restarting frequently. The pump restarting is very detrimental to the health of the irrigation system 106, as it may wear out the electrical components well ahead of their rated life.

Electrical Instrumentation:

The system may also monitor contactors, commutator rings, motor windings, electrical connections, and/or wiring failures. Monitoring electrical transients or power metrics such as THD, Power Factor, current balance can help infer electrical system health.

Monitoring temperatures of the components listed above can also help infer electrical system health.

In aspects, a predictive maintenance system such as a predictive maintenance system for monitoring farm operation can include any number of electrical and/or mechanical components such as sensors, computing devices, and the like that monitor equipment failure (e.g., electrically). For example, tires of drive systems of irrigation systems, such as a pivot, may lose air and/or flatten due to puncturing, prolonged use, uneven terrain, etc., preventing the pivot from operating efficiently and adding superfluous stress and strain on various components of the pivot. In order to reduce or limit the negative effects of flattening tires and/or other drive system anomalies, the predictive maintenance system monitors reactive power, real power, apparent power and/or current changes within the system via the various components to determine when such drive system anomalies occur in real-time. For example, when the tires of a drive system are deflated or flattened, for instance, power or current changes will meet predetermined thresholds that indicate such drive system failure so that such failure can be quickly and efficiently rectified, limiting the negative effects on the system and/or crops. In general, drive system components that increase the required work or efficiency of power conversion and/or current may be detected and assigned with the disclosed technology. Drive system anomalies may include, for example, defects and/or failures in drive system components such as transfer cases, drive shafts, bearings, tires, contactors, guide wire alignment, etc., one or more of which can induce power and/or current changes in the system of the present disclosure that the presently disclosed system can detect, for instance, via a single sensor, and which can be assigned via a controller in communication with the single sensor. The term power, as used herein, may include reactive power, real power, and/or apparent power. In aspects, current balance, power factor, and/or neutral current, may be indicators of drive system anomalies. The predictive maintenance system can include memory having instructions stored thereon, which when executed by a processor, cause the computing system of the predictive maintenance system to indicate (e.g., via an alarm, warning, etc.) when power and/or current changes meet one or more thresholds indicative of drive system anomalies (e.g., tire flattening) so that the anomaly (e.g., deflated tire) can be fixed as quickly as possible.

Generally, farmers do not like deploying sensors as it is assumed they will need repair and distract from their core job of growing crop. Advantageously, the disclosed technology provides the benefit of deploying a single sensor which may be installed for identifying an electrical anomaly on multiple drive systems. The irrigation pivot or straight drive system is a group of independently operating drive systems that turn on and off to caterpillar the system across or around the field. The disclosed technology enables a single sensor to monitor anywhere from one to more than sixteen tower drive systems with a single measurement point.

For example, by analyzing the data from the graphs in FIGS. 11-14, it can be determined that a power factor (PFa) for the pivot being monitored has a good clean signal for indicating a direction (e.g., forward and/or reverse). In aspects, the data may indicate how many towers the system has based on the power in KW (P_KW). For example, the table notes that P_KW indicates six general power levels with twelve unique power states.

Figure 11:
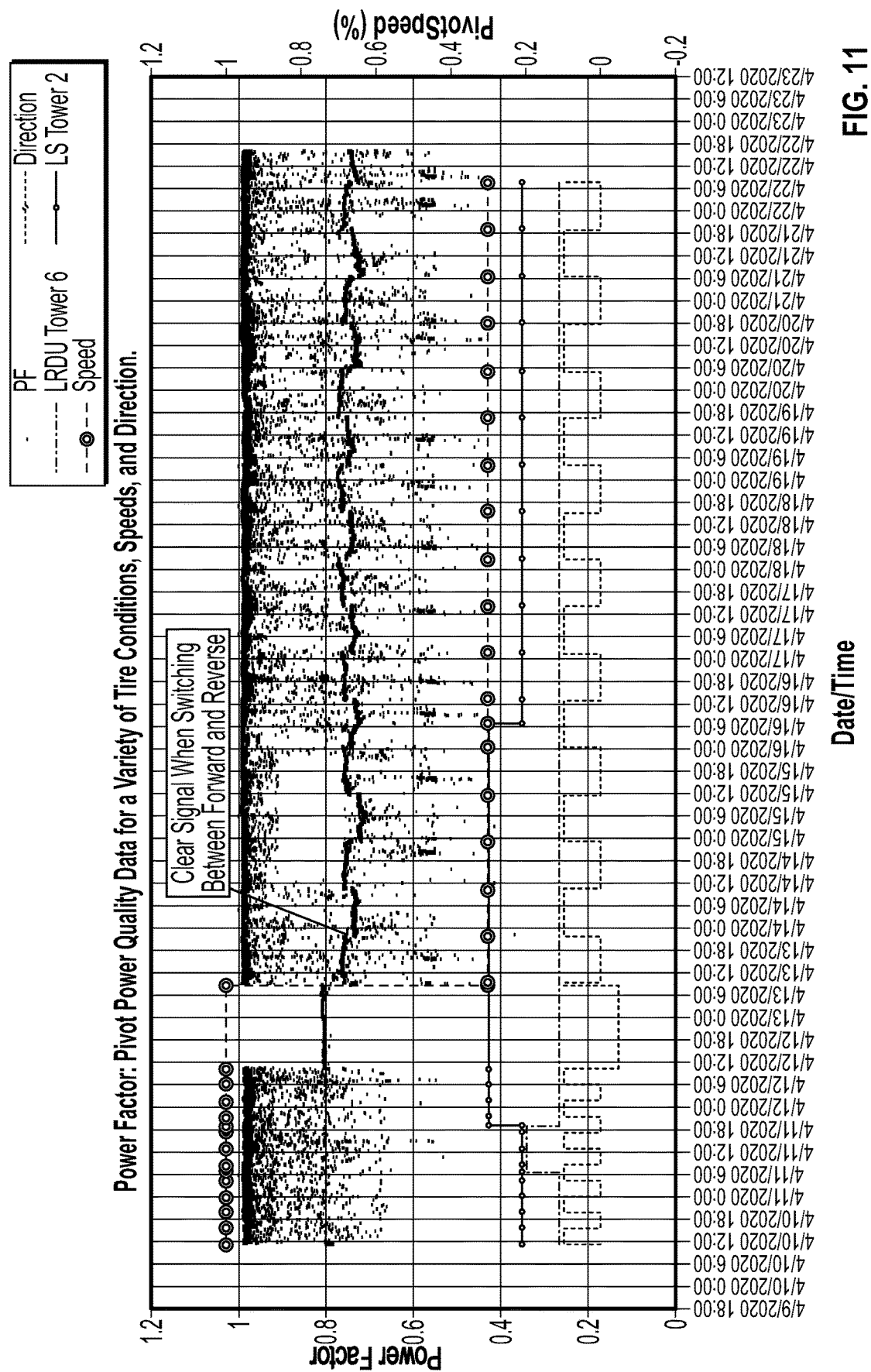
FIGS. 11-14 are graphs depicting the power factor for an example six tower system for a variety of tire conditions, speeds, and directions.
Figure 12:
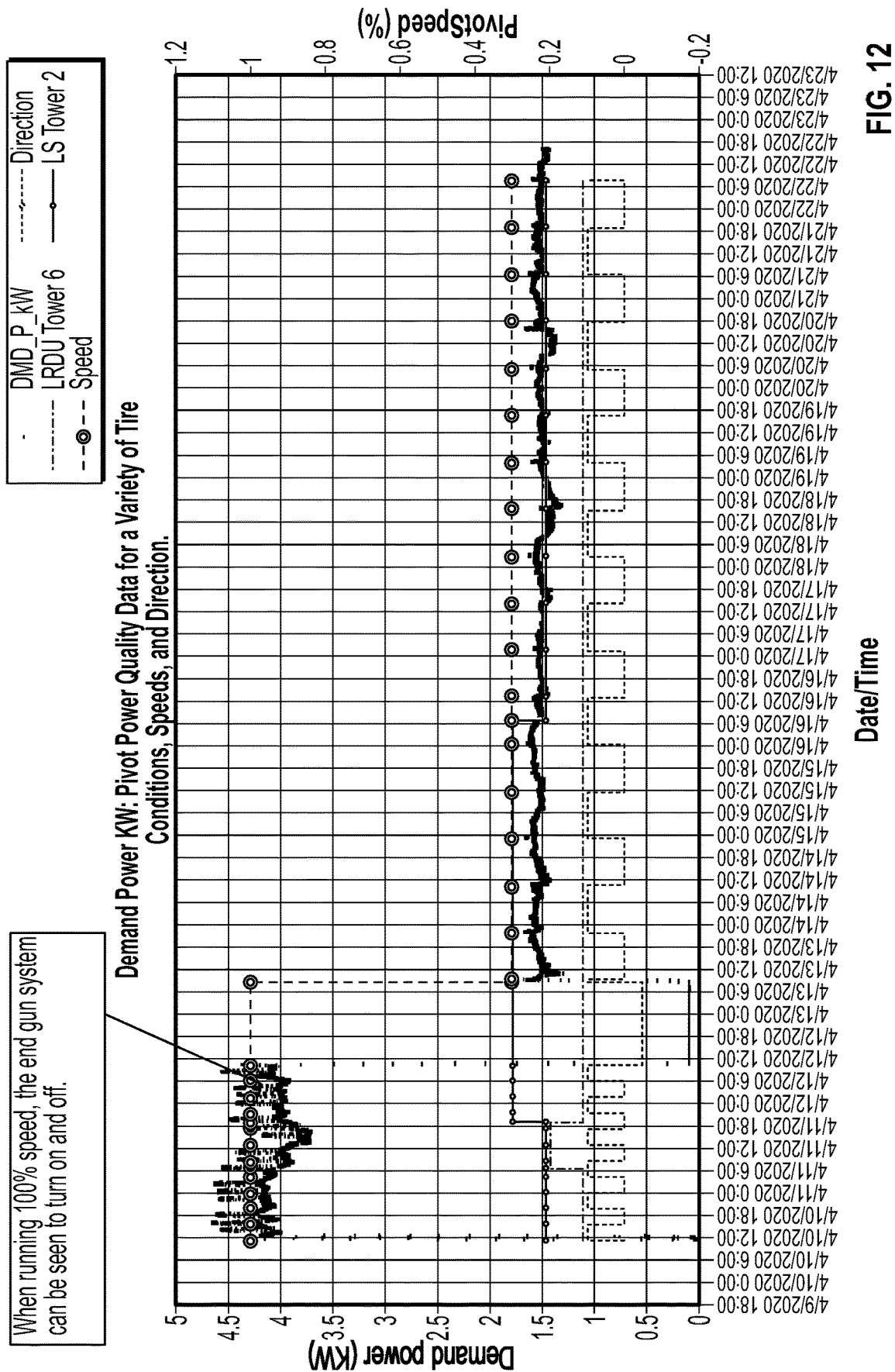
Figure 13:
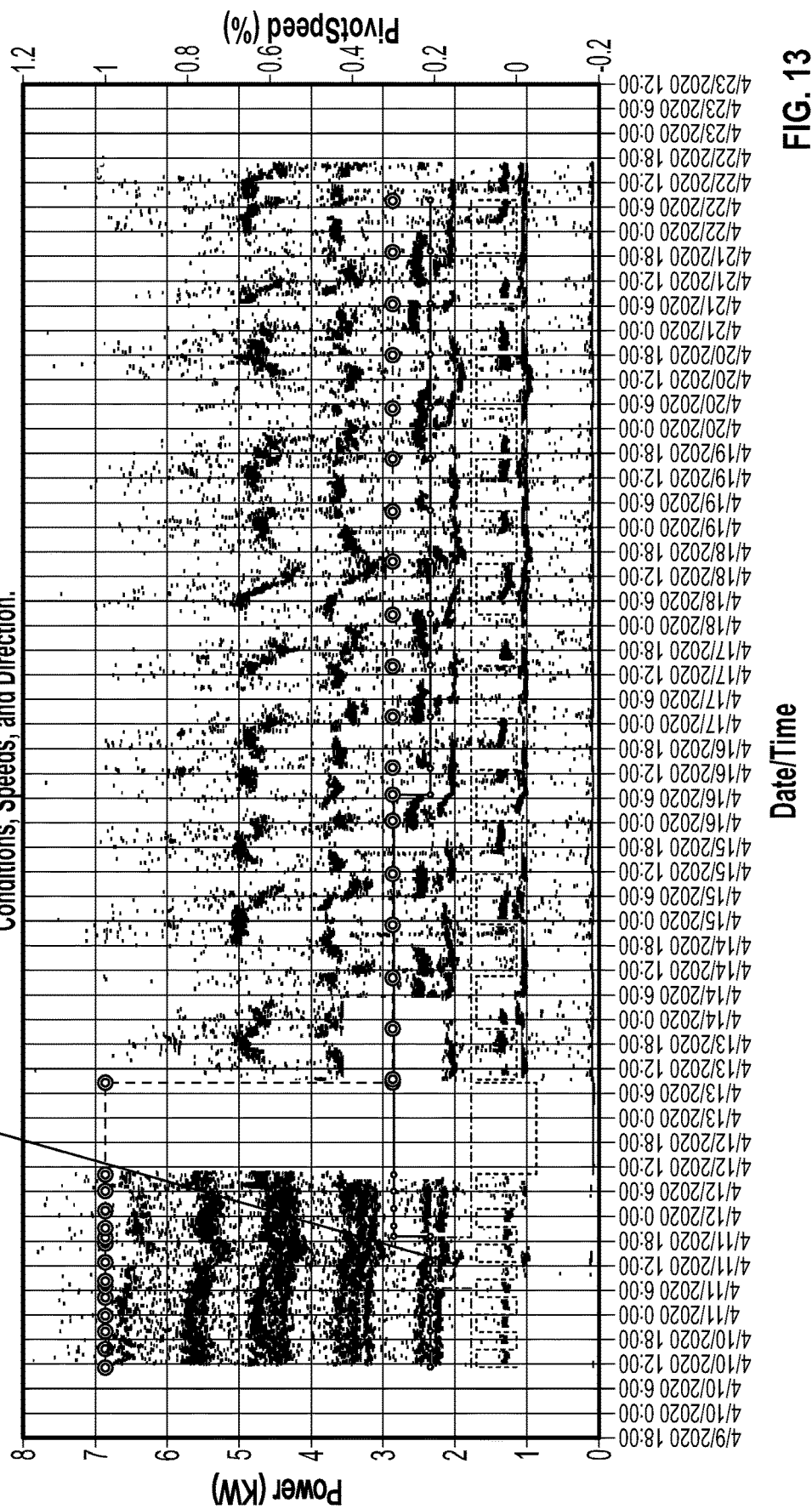
Figure 14:
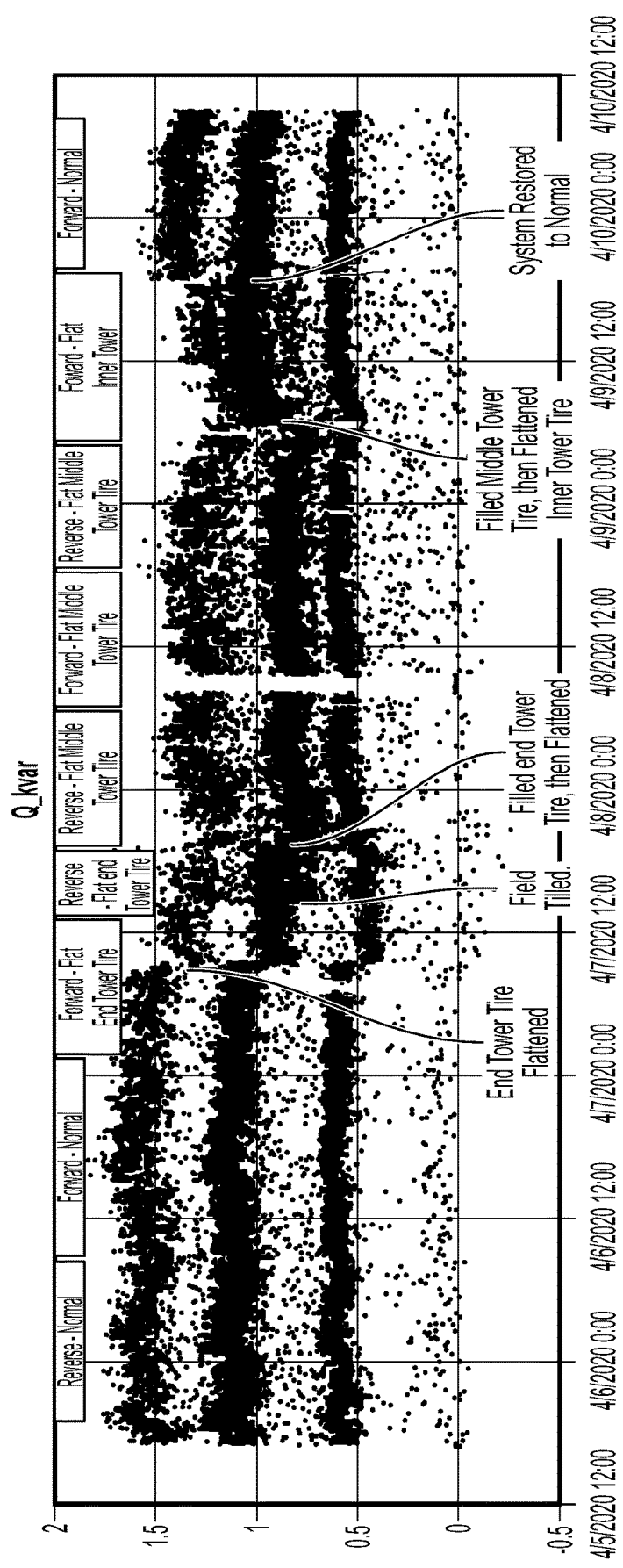

Referring to FIGS. 11-14 graphs depicting the power factor for an example six tower system for a variety of tire conditions, speeds, and directions are shown. FIG. 11 depicts a power factor for the six tower system. The data shows a clear PFa signal when the system is switching between forward and reverse. Referring to FIG. 12, the trace with the dot indicates the speed of the end gun system. Here it may be noted that when running at 100% speed, the sensed data over time may show the end gun system turning on and off, which, for example, may be used for booster pump diagnostics. Referring to FIG. 13, the LDRU Tower 6 trace represents the last regular drive unit (LRDU) tower number 6. Here, it can be noted that the last regular drive unit has a new power state that indicates a tire is flat. Referring to FIG. 14, a three tower run is shown. Here the data shows indications that various tower tires were flattened and filled and that the system was returned to normal. In aspects, the system may include one or more machine learning networks (e.g., a convolutional neural network) configured to determine component failure (e.g., tire, sensor, and/or pivot) based on the data (e.g., the PFa data).

Figure 16:
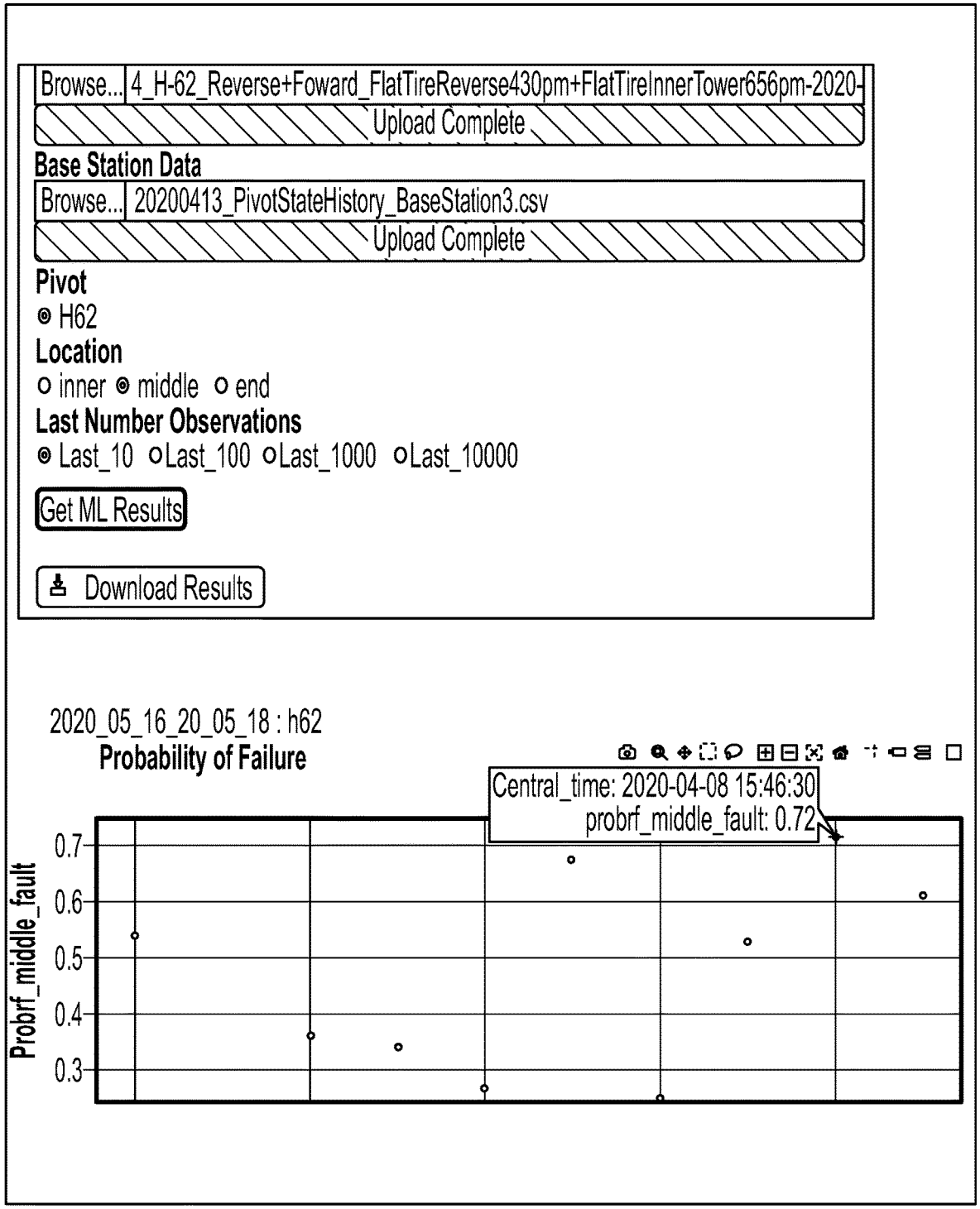
Figure 17:
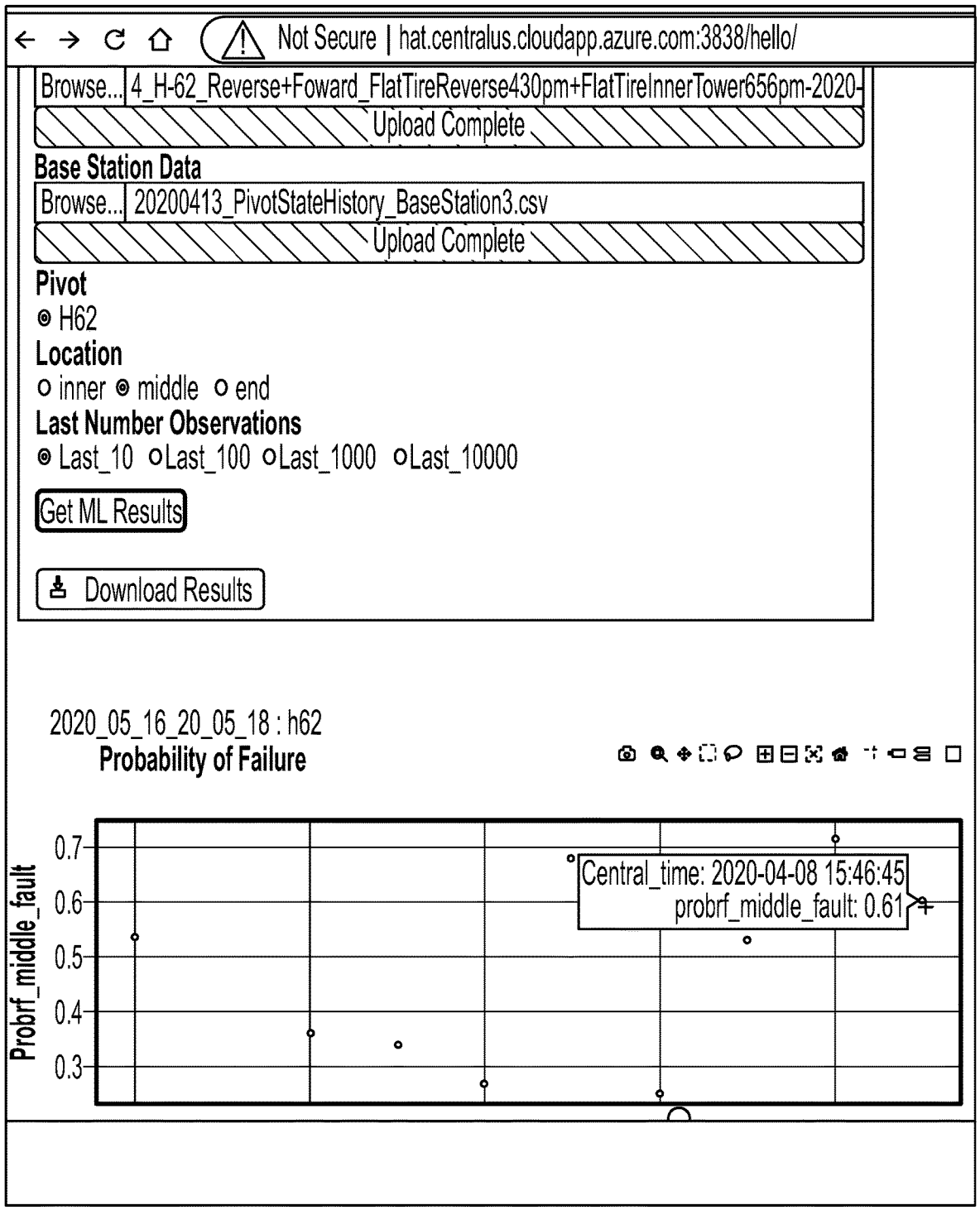
Figure 19:
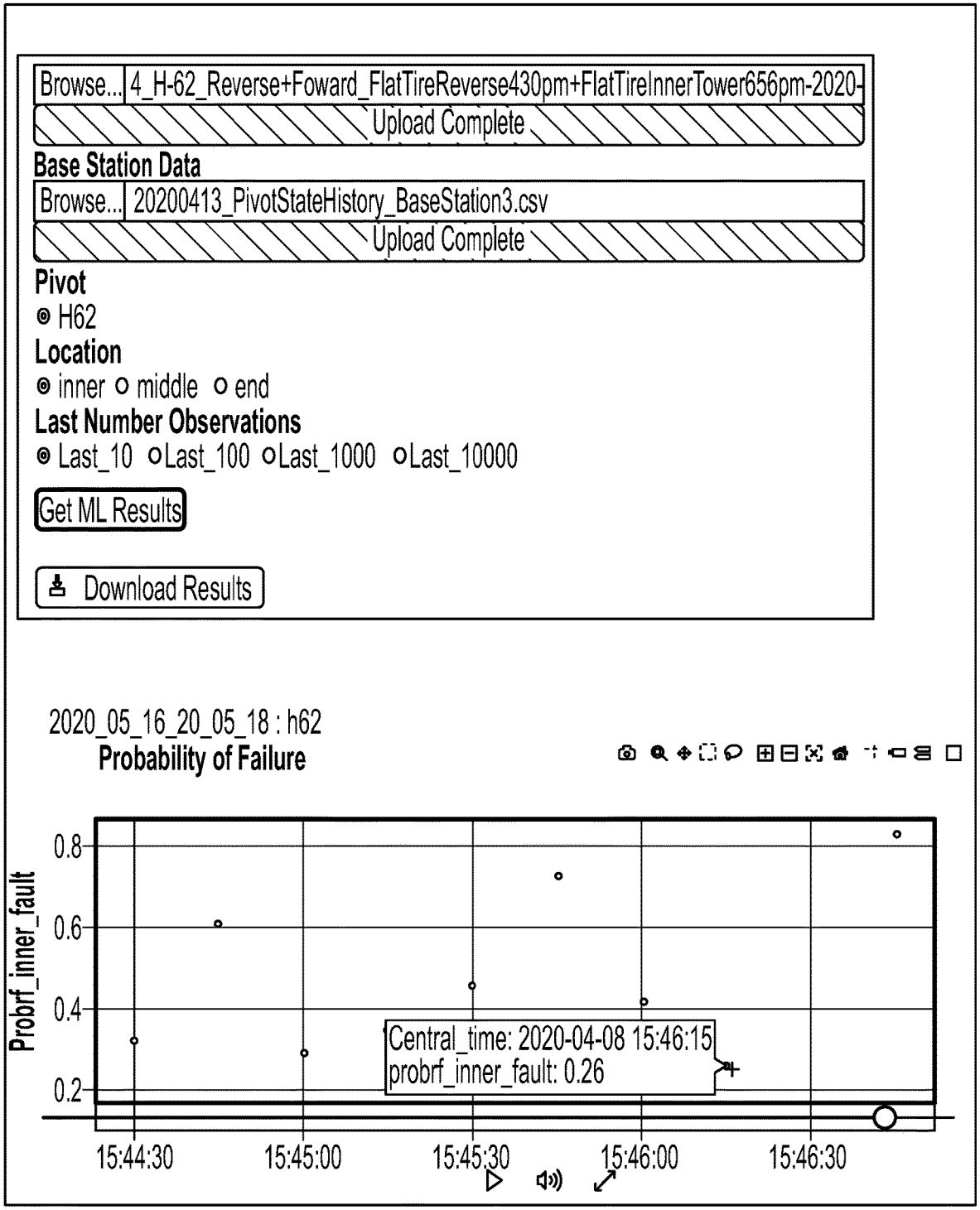
Figure 20:
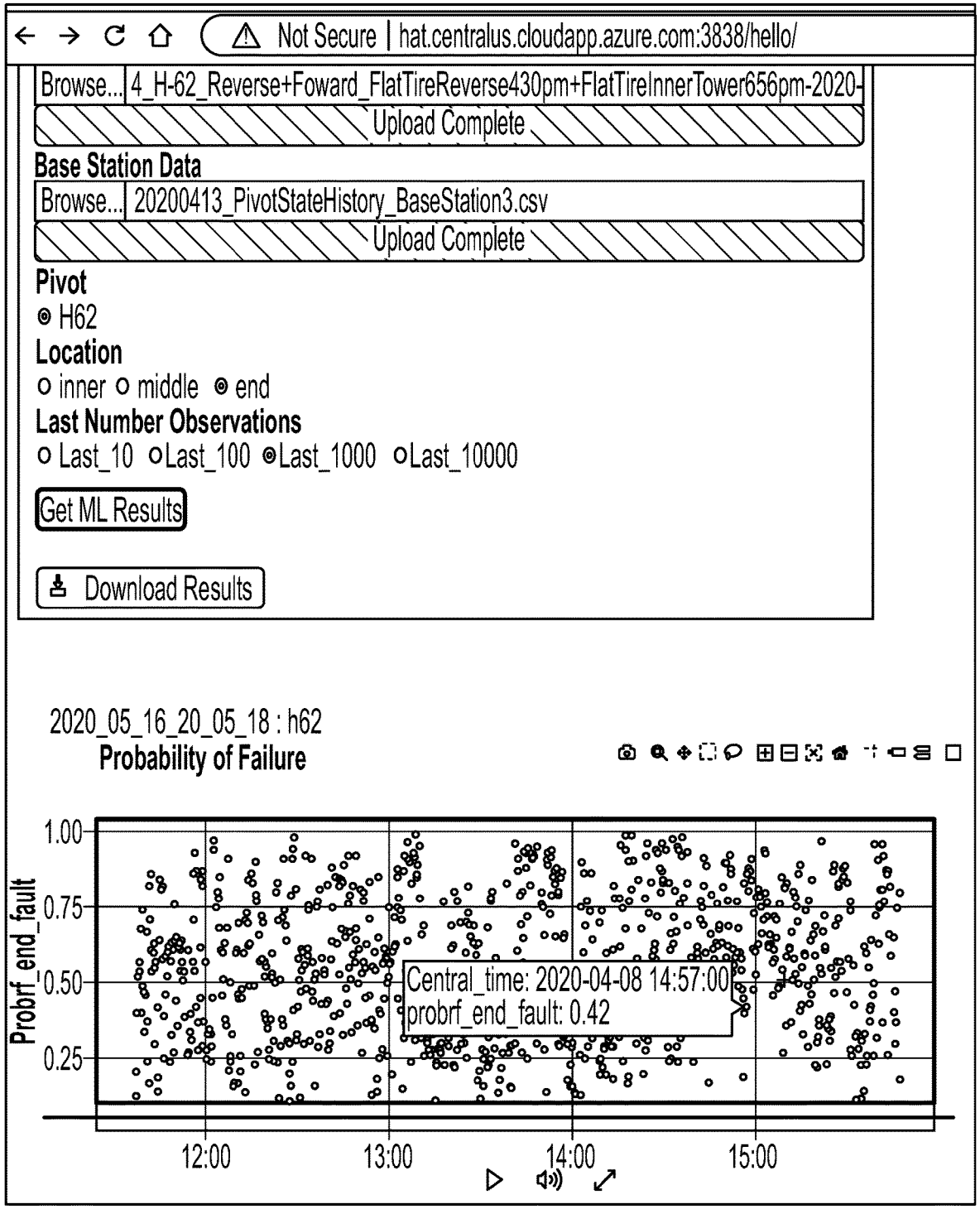

Referring to FIGS. 15-22, screen shots of example user interface screens of the predictive maintenance system are shown. The user interface may enable predictive analysis using machine learning networks (e.g., a neural network). It is contemplated that the machine learning network may be trained based on prior data including fault and no fault conditions. In aspects, portions of the machine learning network may operate on the controller, or may operate on a remote system (e.g., a server and/or the cloud). Training may include supervised or non-supervised learning. In some aspects, a user can initiate a training session while watching operation to simplify setup on each unique end gun and pivot combination since pressures and flows may differ. When the end gun is deemed to be operating normally, the user can open a training window which will then be used to calibrate or train the machine learning model for future anomaly detection. The user interface enables the entry of meter data (e.g., from a delimited file) and/or base station data (e.g., from a second delimited file). The user interface may include the type of pivot (e.g., H62). The user interface may include controls to select a location (e.g., inner, middle, and/or end). The user interface may include controls to select the last number of observations, for example, the last 10, the last 100, the last 1000, etc. (FIG. 15). The system may predict a component failure (e.g., a tire failure) and/or a fault based on the data using a probability (e.g., 0.72). For example, if a middle location is selected and the last number of observations is set to "last 10", then based on the machine learning networks analysis of the meter data and base station data the user interface may provide an indication such as "probability of a middle fault 0.72" (FIG. 16). In another example, if an inner location is selected and the last number of observations is set to "last 10", then based on the machine learning networks analysis of the meter data and base station data, the user interface may provide an indication such as "probability of an inner fault 0.26" (FIG. 19).

Moreover, the disclosed structure can include any suitable mechanical, electrical, and/or chemical components for operating the disclosed pivot predictive maintenance system or components thereof. For instance, such electrical components can include, for example, any suitable electrical and/or electromechanical, and/or electrochemical circuitry, which may include or be coupled to one or more printed circuit boards. As used herein, the term "controller" includes "processor," "digital processing device" and like terms, and are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In some aspects, the controller includes an operating system configured to perform executable instructions. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In some aspects, the operating system is provided by cloud computing.

In some aspects, the term "controller" may be used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In aspects, the controller includes a storage and/or memory device. The storage and/or memory device is one or more physical apparatus used to store data or programs on a temporary or permanent basis. In some aspects, the controller includes volatile memory and requires power to maintain stored information. In various aspects, the controller includes non-volatile memory and retains stored information when it is not powered. In some aspects, the non-volatile memory includes flash memory. In certain aspects, the non-volatile memory includes dynamic random-access memory (DRAM). In some aspects, the non-volatile memory includes ferroelectric random-access memory (FRAM). In various aspects, the non-volatile memory includes phase-change random access memory (PRAM). In certain aspects, the controller is a storage device including, by way of non-limiting examples, CD-ROMs, DVDs, flash memory devices, magnetic disk drives, magnetic tapes drives, optical disk drives, and cloud computing-based storage. In various aspects, the storage and/or memory device is a combination of devices such as those disclosed herein.

In some aspects, the controller includes a display to send visual information to a user. In various aspects, the display is a cathode ray tube (CRT). In various aspects, the display is a liquid crystal display (LCD). In certain aspects, the display is a thin film transistor liquid crystal display (TFT-LCD). In aspects, the display is an organic light emitting diode (OLED) display. In certain aspects, on OLED display is a passive-matrix OLED (PMOLED) or active-matrix OLED (AMOLED) display. In aspects, the display is a plasma display. In certain aspects, the display is a video projector. In various aspects, the display is interactive (e.g., having a touch screen or a sensor such as a camera, a 3D sensor, a LiDAR, a radar, etc.) that can detect user interactions/gestures/responses and the like. In some aspects, the display is a combination of devices such as those disclosed herein.

The controller may include or be coupled to a server and/or a network. As used herein, the term "server" includes "computer server," "central server," "main server," and like terms to indicate a computer or device on a network that manages the system, components thereof, and/or resources thereof. As used herein, the term "network" can include any network technology including, for instance, a cellular data network, a wired network, a fiber optic network, a satellite network, and/or an IEEE 802.11a/b/g/n/ac wireless network, among others.

In various aspects, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In some aspects, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The machine learning ("ML") model may be the most efficient for complex failures. However, basic logic can be used for simpler failure modes. Likely signals of abnormal operation may come from increases in energy required to move the irrigation system, changes in speed of the system, or changes in sequence of the towers moving, end gun turn frequency, or power quality metrics such as phase balance, inrush current, power factor, THD. Since these vary with a complex inference space, ML can assist in predicting abnormal operation and simplify user and subject matter expert input by giving a simple labeling method.

In aspects, the abnormal operation may be predicted by generating, based on the received first set of sensor signals, a data structure that is formatted to be processed through one or more layers of a machine learning model. The data structure may have one or more fields structuring data. The abnormal operation may further be predicted by processing data that includes the data structure, through each of the one or more layers of the machine learning model that has been trained to predict a likelihood that a particular piece of equipment may require maintenance; and generating, by an output layer of the machine learning model, an output data structure. The output data structure may include one or more fields structuring data indicating a likelihood that a particular piece of equipment may require maintenance. The abnormal operation requirement may further be predicted by processing the output data structure to determine whether data organized by the one or more fields of the output data structure satisfies a predetermined threshold. The output data structure includes one or more fields structuring data indicating a likelihood that a particular piece of equipment may require maintenance. The prediction may be generated based on the output data of the machine learning model. The prediction includes the abnormal operation.

As can be appreciated, securement of any of the components of the disclosed apparatus can be effectuated using known securement techniques such welding, crimping, gluing, fastening, etc.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. A predictive maintenance system for an irrigation system including a drive system, the predictive maintenance system comprising:
   at least one sensor configured to measure an amount of a reactive power and generate a signal indicative of abnormal operation within the irrigation system, the sensor electrically coupled to the drive system;
   a processor; and
   a memory, including instructions stored thereon, which when executed by the processor cause the predictive maintenance system to:
      receive the generated signal;
      determine a tire condition of a tire of the drive system based on the generated signal; and
      predict, by a machine learning model, a maintenance requirement of the drive system based on the determined tire condition, wherein the maintenance requirement is predicted by:
         generating, based on the received sensor signal, a data structure that is formatted to be processed through one or more layers of a machine learning model, wherein the data structure includes one or more fields structuring data;
         processing data that includes the data structure, through each of the one or more layers of the machine learning model that have been trained to predict a likelihood that a particular piece of the drive system may require maintenance; and
         generating, by an output layer of the machine learning model, an output data structure, wherein the output data structure includes one or more fields structuring data indicating a likelihood that a particular piece of equipment may require maintenance.

2. The predictive maintenance system of claim 1, wherein the instructions, when executed by the processor, further cause the predictive maintenance system to:
   display on a display of the drive system.

3. The predictive maintenance system of claim 1, wherein the sensor is further configured to measure at least one of a real power, an apparent power, power factor, harmonics, current balance, or a current within the irrigation system.

4. The predictive maintenance system of claim 3, wherein the signal indicative of abnormal operation includes at least one of an indication of movement or positioning of the drive system over a period of time.

5. The predictive maintenance system of claim 4, wherein the signal indicative of abnormal operation is further based on at least one of the real power, the apparent power, or the current being above or below a predetermined threshold.

6. The predictive maintenance system of claim 1, wherein the sensor includes a current sensor, a power sensor, a voltage sensor, or combinations thereof.

7. The predictive maintenance system of claim 1, wherein the instructions, when executed by the processor, further cause the predictive maintenance system to:
   transmit an indication of the predicted maintenance requirement, to a user device for display; and
   display, on a display of the user device, the indication of the predicted maintenance requirement.

8. The predictive maintenance system of claim 1, wherein the machine learning model is based on a deep learning network, a classical machine learning model, or combinations thereof.

9. The predictive maintenance system of claim 8, wherein the instructions, when executed by the processor, further cause the predictive maintenance system to receive data from at least one of a weather station, a field soil moisture sensor, a terrain and soil map, a temperature sensor, or National Oceanic and Atmospheric Administration weather.

10. The predictive maintenance system of claim 8, wherein the prediction is based on comparing a power or a duty cycle sensed by the sensor to an expected power or duty cycle.

11. A computer-implemented method for predictive maintenance for an irrigation system, the computer-implemented method comprising:
   receiving a signal, sensed by a sensor coupled to a drive system of the irrigation system, the signal indicative of a condition of abnormal operation of the drive system, the irrigation system configured to irrigate a predetermined area, wherein the sensor is configured to measure an amount of a reactive power;
   determining a tire condition of a tire of the drive system; and
   predicting, by a machine learning model, a maintenance requirement of the drive system based on the determined tire condition,
   wherein the maintenance requirement is predicted by:
      generating, based on the received sensor signal, a data structure that is formatted to be processed through one or more layers of a machine learning model, wherein the data structure includes one or more fields structuring data;
      processing data that includes the data structure, through each of the one or more layers of the machine learning model that have been trained to predict a likelihood that a particular piece of the drive system may require maintenance; and
      generating, by an output layer of the machine learning model, an output data structure, wherein the output data structure includes one or more fields structuring data indicating a likelihood that a particular piece of equipment may require maintenance.

12. The computer-implemented method of claim 11, further comprising:
   displaying on a display the predicted maintenance requirement of the drive system.

13. The computer-implemented method of claim 11, wherein the sensor is further configured to measure an amount of at least one of a real power, an apparent power, or a current within the irrigation system.

14. The computer-implemented method of claim 13, wherein the signal indicating a condition of abnormal operation includes an indication of movement or positioning of the drive system over a period of time.

15. The computer-implemented method of claim 14, wherein the signal indicating a condition of abnormal operation is further based on an end gun turn frequency being above or below a predetermined threshold.

16. The computer-implemented method of claim 11, wherein the sensor includes a current sensor, a power sensor, a voltage sensor, or combinations thereof.

17. The computer-implemented method of claim 11, further comprising:
    transmitting an indication of the predicted maintenance requirement, to a user device for display; and
    displaying, on a display of the user device, the indication of the predicted maintenance requirement.

18. The computer-implemented method of claim 11, wherein the machine learning model is based on a deep learning network, a classical machine learning model, or combinations thereof.

19. The computer-implemented method of claim 18, wherein the prediction is based on comparing a power sensed by the sensor to an expected power based on at least one of a soil moisture directly measured, a soil moisture inferred from weather data from the field or regional weather stations, a topographical map, a soil map, a motor RPM, a gearbox ratio, a tower weight, a span weight, an operating condition of the drive system, or combinations thereof.

20. A non-transitory computer-readable medium storing instructions that, when executed by a processor, cause the processor to perform a method for predictive maintenance for an irrigation system, the method comprising:
    receiving a signal, sensed by a sensor coupled to a drive system of the irrigation system, the signal indicative of a condition of abnormal operation of the drive system, the irrigation system configured to irrigate a predetermined area, wherein the sensor is configured to measure an amount of a reactive power;
    determining a tire condition of a tire of the drive system based on the received signal;
    predicting, by a machine learning model, a maintenance requirement of the drive system based on the determined the tire condition; and
    displaying on a display the predicted maintenance requirement of the drive system,
    wherein the maintenance requirement is predicted by:
        generating, based on the received sensor signal, a data structure that is formatted to be processed through one or more layers of a machine learning model, wherein the data structure includes one or more fields structuring data;
        processing data that includes the data structure, through each of the one or more layers of the machine learning model that have been trained to predict a likelihood that a particular piece of the drive system may require maintenance; and
        generating, by an output layer of the machine learning model, an output data structure, wherein the output data structure includes one or more fields structuring data indicating a likelihood that a particular piece of equipment may require maintenance.

* * * * *